(12) United States Patent
Wu et al.

(10) Patent No.: US 12,058,575 B2
(45) Date of Patent: Aug. 6, 2024

(54) COMMUNICATION METHOD AND COMMUNICATIONS APPARATUS

(71) Applicant: Huawei Technologies Co., Ltd., Shenzhen (CN)

(72) Inventors: Yizhuang Wu, Beijing (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 556 days.

(21) Appl. No.: 17/323,572

(22) Filed: May 18, 2021

(65) Prior Publication Data
US 2021/0274407 A1 Sep. 2, 2021

Related U.S. Application Data

(63) Continuation of application No. PCT/CN2019/119293, filed on Nov. 18, 2019.

(30) Foreign Application Priority Data

Nov. 19, 2018 (CN) .......................... 201811379025.1

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0022* (2013.01); *H04W 36/30* (2013.01)

(58) Field of Classification Search
None
See application file for complete search history.

(56) References Cited

U.S. PATENT DOCUMENTS

| 2015/0189555 A1 | 7/2015 | Ahluwalia |
| 2015/0208283 A1 | 7/2015 | Yang et al. |

(Continued)

FOREIGN PATENT DOCUMENTS

| CN | 101047975 A | 10/2007 |
| CN | 101198155 A | 6/2008 |

(Continued)

OTHER PUBLICATIONS

Qualcomm et al., "Correction on the update of RAN in subscription change", 3GPP TSG-SA WG2 Meeting #123, S2-177207, Ljubljana, Slovenia, Oct. 23-27, 2017, 29 pages.

(Continued)

*Primary Examiner* — Scott M Sciacca
(74) *Attorney, Agent, or Firm* — Slater Matsil, LLP

(57) ABSTRACT

Embodiments of this application relate to the field of communications technologies, and in particular, to a communication method and a communications apparatus. The solution includes: sending, by a source access network device, a first data packet of a terminal to a target access network device; and when the source access network device determines that the target access network device has received the first data packet, sending, by the source access network device, a first message to the terminal, where the first message is used to indicate the terminal to hand over to the target access network device.

20 Claims, 19 Drawing Sheets

(51) Int. Cl.
*H04W 36/02* (2009.01)
*H04W 36/30* (2009.01)

(56) References Cited

U.S. PATENT DOCUMENTS

| | | | |
|---|---|---|---|
| 2018/0317137 A1 | 11/2018 | Liehr et al. | |
| 2019/0191338 A1* | 6/2019 | Yu | H04W 36/0007 |
| 2020/0045601 A1* | 2/2020 | Pedersen | H04W 36/08 |
| 2020/0154333 A1* | 5/2020 | Paladugu | H04B 7/18506 |
| 2020/0252838 A1* | 8/2020 | Akdeniz | H04W 36/0016 |
| 2021/0337432 A1* | 10/2021 | Lee | H04W 36/0016 |

FOREIGN PATENT DOCUMENTS

| | | | |
|---|---|---|---|
| CN | 101291291 A | 10/2008 | |
| CN | 102246555 A | 11/2011 | |
| CN | 102469557 A | 5/2012 | |
| CN | 102833802 A | 12/2012 | |
| CN | 103533586 A | 1/2014 | |
| CN | 105580429 A | 5/2016 | |
| CN | 108632928 A | 10/2018 | |
| EP | 2432275 A1 | 3/2012 | |
| RU | 2420924 C2 | 6/2011 | |
| WO | WO-2018027947 A1 * | 2/2018 | H04W 36/0007 |

OTHER PUBLICATIONS

3GPP TR 23.725 V1.1.0 (Oct. 2018), 3rd Generation Partnership Project; Technical Specification Group Services and System Aspects; Study on enhancement of Ultra-Reliable Low-Latency Communication (URLLC) support in the 5G Core network (5GC) (Release 16), 67 pages.
CMCC, "Considerations of 'Oms' handover interruption for NR", 3GPP TSG-RAN WG2 Meeting #97bis, R2-1702920, Spokane, Washington, US, Apr. 3-7, 2017, 3 pages.
Huawei, "Data forwarding with QoS flow relocation", 3GPP TSG-RAN3 Meeting#95bis, R3-171072, Spokane, Washington, US, Apr. 3-7, 2017, 6 pages.
Huawei et al., "Solution for KI 2#: Optimizion of handover procedure for URLLC services", 3GPP TSG-SA2 Meeting #127BIS, S2-185180, Newport Beach, California, US, May 28-Jun. 1, 2018, 4 pages.
Oppo et al. "Updating for solution#5 in FS_URLLC", SA WG2 Meeting #128bis, S2-188481 (was8397 was 7843), Sophia Antipolis, France, Aug. 20-24, 2018, 8 pages.
3GPP TS 38.300 V15.3.1 (Oct. 2018), "3rd Generation Partnership Project; Technical Specification Group Radio Access Network; NR; NR and NG-RAN Overall Description; Stage 2 (Release 15)," 92 pages.

* cited by examiner

········ The terminal 1 accesses the NG-Core through the eLTE eNB
— — The terminal 1 accesses the EPC through the eLTE eNB

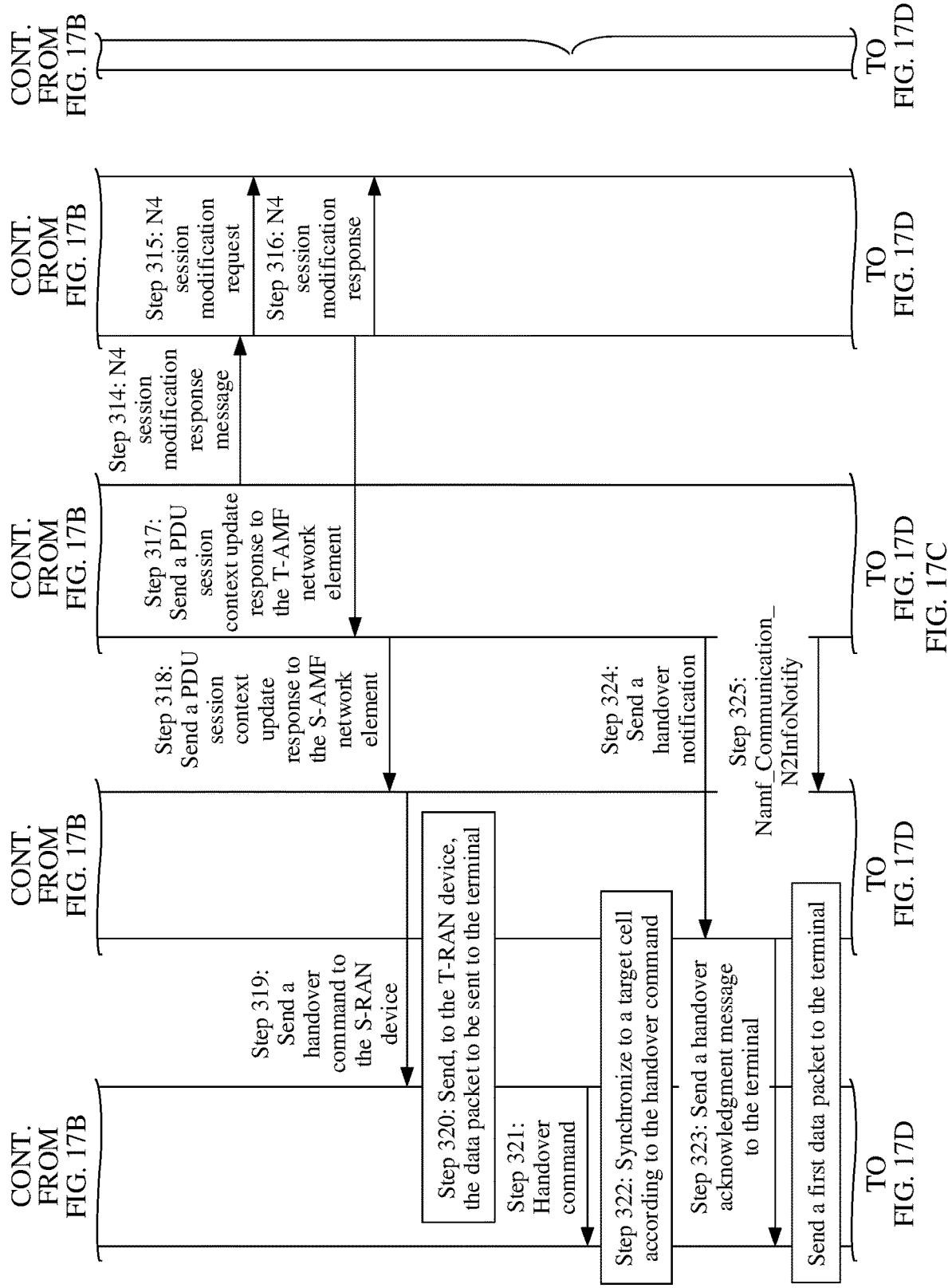

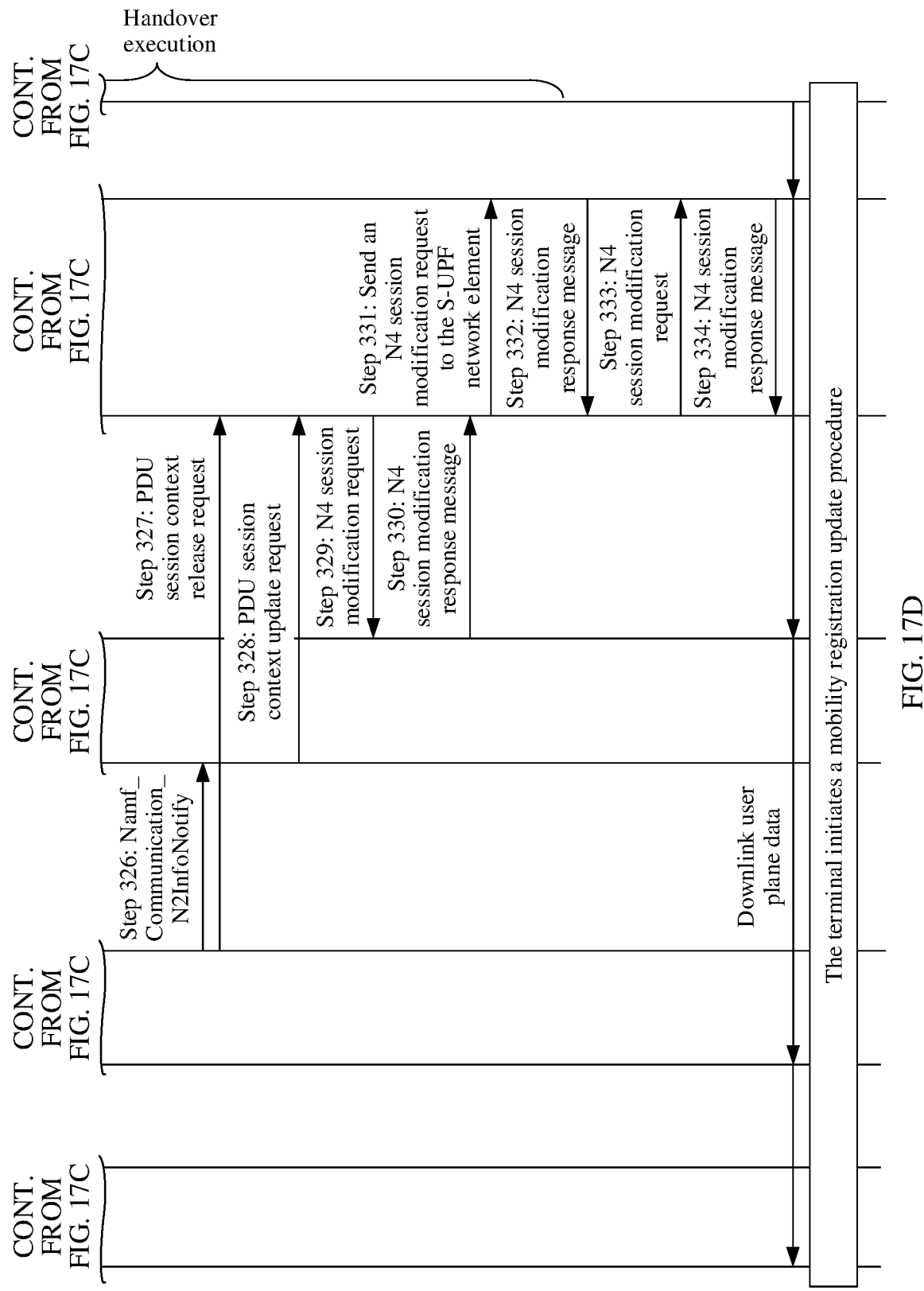

COMMUNICATION METHOD AND COMMUNICATIONS APPARATUS

CROSS-REFERENCE TO RELATED APPLICATIONS

This application is a continuation of International Application No. PCT/CN2019/119293, filed on Nov. 18, 2019, which claims priority to Chinese Patent Application No. 201811379025.1, filed on Nov. 19, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

To ensure service continuity, for example, when a terminal moves from a coverage area of a source base station to a coverage area of a target base station, the source base station may hand over the terminal to the target base station, so that the target base station serves the terminal.

Usually, before the terminal successfully hands over from the source base station to the target base station, the source base station still sends a downlink data packet to the terminal. However, in an existing handover procedure, signal quality of an air interface may be very poor, and reliability of the downlink data packet received before the terminal successfully hands over to the target base station cannot be ensured. Further, in the existing handover procedure, the source base station starts to send the downlink data packet of the terminal to the target base station only after sending a handover command to the terminal. As a result, when the terminal is synchronized to the target base station, because the target base station does not receive the downlink data packet of the terminal from the source base station, the target base station cannot immediately send the downlink data packet to the terminal. Consequently, a problem of a long handover latency is caused.

For example, a 5G system needs to provide a service that supports ultra-reliable low-latency communication (URLLC). To ensure a URLLC service, high reliability and a low latency also need to be ensured in a handover procedure. Therefore, a handover procedure in a current technology cannot satisfy requirements for high reliability and a low latency of a URLLC service.

SUMMARY

Embodiments of this application provide a communication method and a communications apparatus, to improve reliability of downlink data received by a terminal in a process in which the terminal hands over between access network devices and reduce a latency.

To achieve the foregoing objective, the embodiments of this application provide the following technical solutions.

According to a first aspect, an embodiment of this application provides a communication method, including: sending, by a source access network device, a first data packet of a terminal to a target access network device; and when the source access network device determines that the target access network device has received the first data packet, sending, by the source access network device, a first message to the terminal, where the first message is used to indicate the terminal to hand over to the target access network device.

According to the communication method provided in this embodiment of this application. In a process in which the terminal hands over to the target access network device (that is, before the source access network device sends the first message to the terminal), the source access network device still needs to send the first data packet to the terminal. If signal quality of an air interface is poor in the handover procedure, the terminal may not receive the first data packet. Therefore, the source access network device sends the first data packet to the target access network device. In this way, when determining that the target access network device has received the first data packet, the source access network device sends, to the terminal, the first message for indicating the terminal to hand over to the target access network device. On the one hand, the target access network device is enabled to have the first data packet. On the other hand, after determining that the target access network device has received the first data packet, the source access network device sends the first message to the terminal, so that after the terminal successfully hands over from the source access network device to the target access network device, the target access network device sends the first data packet to the terminal. In this way, it can be ensured that when the terminal cannot receive the first data packet from the source access network device in the handover procedure, the terminal can further obtain the first data packet from the target access network device, thereby ensuring data transmission reliability. In addition, because the source access network device sends the data packet to the target access network device before sending a handover command to the terminal, compared with a current technology in which the data packet of the terminal is sent to the target access network device only after the handover command is sent to the terminal, a latency can further be reduced.

In a possible implementation, the method provided in this embodiment of this application further includes: receiving, by the source access network device, first information from the target access network device, where the first information is used to indicate that the handover of the terminal to the target access network device is allowed; and sending, by the source access network device, the first data packet to the target access network device. That is, when the source access network device receives the first information indicating that the handover is allowed, the source access network device sends the first data packet to the target access network device.

In a possible implementation, before the sending, by the source access network device, the first data packet to the target access network device, the method provided in this embodiment of this application further includes: determining, by the source access network device based on the first information, that the target access network device allows the handover of the terminal to the target access network device. In this way, when determining that the target access network device agrees to the handover, the source access network device starts to send the first data packet. This can avoid an air interface resource waste caused by blindly sending of the first data packet because the target access network device does not agree to the handover.

In a possible implementation, the first data packet includes a replicated data packet, and the method provided in this embodiment of this application further includes: obtaining, by the source access network device, the replicated data packet; or when a condition under which the terminal hands over between the access network devices is satisfied, obtaining, by the source access network device, the replicated data packet.

In a possible implementation, the obtaining, by the source access network device, the replicated data packet includes: replicating, by the source access network device, a data packet satisfying a preset condition in at least one data packet of the terminal, to obtain the replicated data packet, where the data packet satisfying the preset condition includes at least one of the following cases: a data packet using a preset quality of service QoS flow, a data packet on a preset packet data unit PDU session, a data packet whose packet loss rate is less than or equal to a preset threshold, or a data packet on a preset radio bearer. In this way, the data packet that needs to be replicated may be selected based on the preset condition, to first ensure reliability of the data packet satisfying the preset condition.

In a possible implementation, the obtaining, by the source access network device, the replicated data packet includes: replicating, by the source access network device, a data packet of the terminal to obtain the replicated data packet.

In a possible implementation, the method provided in this embodiment of this application further includes: determining, by the source access network device, that the condition under which the terminal hands over between the access network devices is satisfied, and performing, by the source access network device, the foregoing replication step.

In a possible implementation, the method provided in this embodiment of this application further includes: sending, by the source access network device, sequence number SN status information to the target access network device, where the SN status information is used by the target access network device to send a data packet to the terminal. The SN status information is sent, so that the target access network device sets an SN of the data packet.

In a possible implementation, that the source access network device determines that the target access network device has received the first data packet includes: receiving, by the source access network device, a second message sent by the target access network device, where the second message is used to indicate that the target access network device has received the first data packet; or determining, by the source access network device based on latency information, that the target access network device has received the first data packet.

In a possible implementation, the method provided in this embodiment of this application further includes: determining, by the source access network device, the latency information based on QoS information of the first data packet; or obtaining, by the source access network device, the latency information from a session management function network element.

According to a second aspect, an embodiment of this application provides a communication method, including: sending, by a target access network device, first information to a source access network device, where the first information is used to indicate that a handover of a terminal to the target access network device is allowed; receiving, by the target access network device, a first data packet of the terminal from the source access network device; and when the terminal successfully hands over from the source access network device to the target access network device, sending, by the target access network device, the first data packet to the terminal.

In a possible implementation, the method provided in this embodiment of this application further includes: sending, by the target access network device, a second message to the source access network device, where the second message is used to indicate that the target access network device has received the first data packet.

In a possible implementation, the method provided in this embodiment of this application further includes: receiving, by the target access network device, sequence number SN status information from the source access network device, where the SN status information is used by the target access network device to send a data packet to the terminal; obtaining, by the target access network device, a second data packet based on the SN status information and a data packet that carries no SN and that is from the source access network device, where the data packet that carries no SN is a data packet in the first data packet or a data packet of the terminal in the source access network device; and sending, by the target access network device, the second data packet to the terminal. An SN of the second data packet is determined based on the SN status information.

According to a third aspect, an embodiment of this application provides a communications apparatus. The communications apparatus can implement the communication method according to any one of the first aspect or the possible implementations of the first aspect, and therefore can further implement beneficial effects of the method according to any one of the first aspect or the possible implementations of the first aspect. The communications apparatus may be a source access network device, or may be an apparatus, for example, a chip used in the source access network device, that can support the source access network device in implementing the method according to any one of the first aspect or the possible implementations of the first aspect. The communications apparatus may implement the foregoing method by using software, hardware, or hardware executing corresponding software.

In an example, the communications apparatus includes a sending unit and a processing unit. The sending unit is configured to send a first data packet of a terminal to a target access network device. The sending unit is further configured to: when the processing unit determines that the target access network device has received the first data packet, send a first message to the terminal, where the first message is used to indicate the terminal to hand over to the target access network device.

In a possible implementation, the communications apparatus further includes: a receiving unit, configured to receive first information from the target access network device, where the first information is used to indicate that the handover of the terminal to the target access network device is allowed, where the sending unit is further configured to send the first data packet of the terminal to the target access network device.

In a possible implementation, the first data packet includes a replicated data packet, and the processing unit is further configured to obtain the replicated data packet; or the processing unit is further configured to: when a condition under which the terminal hands over between the access network devices is satisfied, obtain the replicated data packet.

In a possible implementation, the processing unit is further specifically configured to replicate a data packet satisfying a preset condition in at least one data packet of the terminal, to obtain the replicated data packet, where the data packet satisfying the preset condition includes at least one of the following cases: a data packet using a preset quality of service QoS flow, a data packet on a preset packet data unit PDU session, a data packet whose packet loss rate is less than or equal to a preset threshold, or a data packet on a preset radio bearer.

In a possible implementation, the processing unit is further specifically configured to replicate a data packet of the terminal to obtain the replicated data packet.

In a possible implementation, the processing unit is further configured to: determine that the condition under which the terminal hands over between the access network devices is satisfied, and perform the foregoing replication step.

In a possible implementation, the sending unit is further configured to send sequence number SN status information to the target access network device, where the SN status information is used by the target access network device to send a data packet to the terminal.

In a possible implementation, the receiving unit is configured to receive a second message sent by the target access network device, where the second message is used to indicate that the target access network device has received the first data packet; and the receiving unit is specifically configured to determine, based on the second message, that the target access network device has received the first data packet; or the processing unit is specifically configured to determine, based on latency information, that the target access network device has received the first data packet. In this way, the source access network device determines, in a plurality of manners, that the target access network device has received the first data packet.

In a possible implementation, the processing unit is further configured to determine the latency information based on QoS information of the first data packet; or the processing unit is further configured to obtain the latency information from a session management function network element.

In another example, an embodiment of this application further provides a communications apparatus. The communications apparatus may be a source access network device or a chip used in the source access network device. The communications apparatus includes a communications interface and one or more processors.

The source access network device communicates with another device through the communications interface. When the one or more processors execute instructions, the source access network device performs the communication method according to the first aspect.

For example, the communications interface is configured to support the communications apparatus in performing the message/data sending and receiving steps performed on a side of the communications apparatus according to any one of the first aspect or the possible implementations of the first aspect. The processor is configured to support the communications apparatus in performing the message/data processing step on the side of the communications apparatus according to any one of the first aspect or the possible implementations of the first aspect. For a specific corresponding step, refer to the descriptions in any one of the first aspect or the possible implementations of the first aspect. Details are not described herein again.

Optionally, the communications interface and the processor of the communications apparatus are coupled to each other.

Optionally, the communications apparatus may further include a memory, configured to store computer program code, and the computer program code includes instructions. Optionally, the processor, the communications interface, and the memory are coupled to each other.

According to a fourth aspect, an embodiment of this application provides a communications apparatus. The communications apparatus can implement the communication method according to any one of the second aspect or the possible implementations of the second aspect, and therefore can further implement beneficial effects according to any one of the second aspect or the possible implementations of the second aspect. The communications apparatus may be a target access network device, or may be an apparatus, for example, a chip used in the target access network device, that can support the target access network device in implementing any one of the second aspect or the possible implementations of the second aspect. The communications apparatus may implement the foregoing method by using software, hardware, or hardware executing corresponding software.

For example, the communications apparatus includes: a sending unit, configured to send first information to a source access network device, where the first information is used to indicate that a handover of a terminal to the target access network device is allowed; and a receiving unit, configured to receive a first data packet of the terminal from the source access network device, where the sending unit is configured to: when the terminal successfully hands over from the source access network device to the target access network device, send the first data packet to the terminal.

In a possible implementation, the sending unit is further configured to send a second message to the source access network device, where the second message is used to indicate that the target access network device has received the first data packet.

In a possible implementation, the receiving unit is further configured to receive sequence number SN status information from the source access network device, where the SN status information is used by the target access network device to send a data packet to the terminal; the sending unit is further configured to obtain a second data packet based on the SN status information and a data packet that carries no SN and that is from the source access network device, where the data packet that carries no SN is a data packet in the first data packet or a data packet of the terminal in the source access network device; and the sending unit is further configured to send the second data packet to the terminal.

In another example, an embodiment of this application further provides a communications apparatus. The communications apparatus may be a target access network device or a chip used in the target access network device. The communications apparatus includes a communications interface and one or more processors.

The target access network device communicates with another device through the communications interface. When the one or more processors execute instructions, the target access network device performs the communication method according to the second aspect.

For example, the communications interface is configured to support the communications apparatus in performing the message/data sending and receiving steps performed on a side of the communications apparatus according to any one of the second aspect or the possible implementations of the second aspect. The processor is configured to support the communications apparatus in performing the message/data processing step on the side of the communications apparatus according to any one of the second aspect or the possible implementations of the second aspect. For a specific corresponding step, refer to the descriptions in any one of the second aspect or the possible implementations of the second aspect. Details are not described herein again.

Optionally, the communications interface and the processor of the communications apparatus are coupled to each other.

Optionally, the communications apparatus may further include a memory, configured to store computer program code, and the computer program code includes instructions. Optionally, the processor, the communications interface, and the memory are coupled to each other.

According to a fifth aspect, an embodiment of this application provides a computer-readable storage medium. The computer-readable storage medium stores instructions. When the instructions are run on a computer, the computer is enabled to perform the communication method according to the first aspect or the possible implementations of the first aspect.

According to a sixth aspect, this application provides a computer-readable storage medium. The computer-readable storage medium stores instructions. When the instructions are run on a computer, the computer is enabled to perform the communication method according to the second aspect or the possible implementations of the second aspect.

According to a seventh aspect, this application provides a computer program product including instructions. When the instructions are run on a computer, the computer is enabled to perform the communication method according to the first aspect or the possible implementations of the first aspect.

According to an eighth aspect, this application provides a computer program product including instructions. When the instructions are run on a computer, the computer is enabled to perform the communication method according to the second aspect or the possible implementations of the second aspect.

According to a ninth aspect, an embodiment of this application provides a chip. The chip includes a processor and a communications interface. The communications interface is coupled to the processor. The processor is configured to run a computer program or instructions, to implement the communication method according to the first aspect or the possible implementations of the first aspect. The communications interface is configured to communicate with a module other than the chip.

According to a tenth aspect, an embodiment of this application provides a chip. The chip includes a processor and a communications interface. The communications interface is coupled to the processor. The processor is configured to run a computer program or instructions, to implement the communication method according to the second aspect or the possible implementations of the second aspect. The communications interface is configured to communicate with a module other than the chip.

According to an eleventh aspect, an embodiment of this application provides a communications system. The system includes: the source access network device according to the third aspect and the possible implementations of the third aspect, and the target access network device according to the fourth aspect and the possible implementations of the fourth aspect.

For beneficial effects of the second aspect, the third aspect, the fourth aspect, the fifth aspect, the sixth aspect, the seventh aspect, the eighth aspect, the ninth aspect, the tenth aspect, the eleventh aspect, and the implementations thereof in this application, refer to beneficial effect analysis in the first aspect and the implementations of the first aspect. Details are not described herein again.

BRIEF DESCRIPTION OF THE DRAWINGS

FIG. 17A, FIG. 17B, FIG. 17C, and FIG. 17D are another schematic flowchart of a specific embodiment according to an embodiment of this application;

DETAILED DESCRIPTION OF ILLUSTRATIVE EMBODIMENTS

Figure 1:
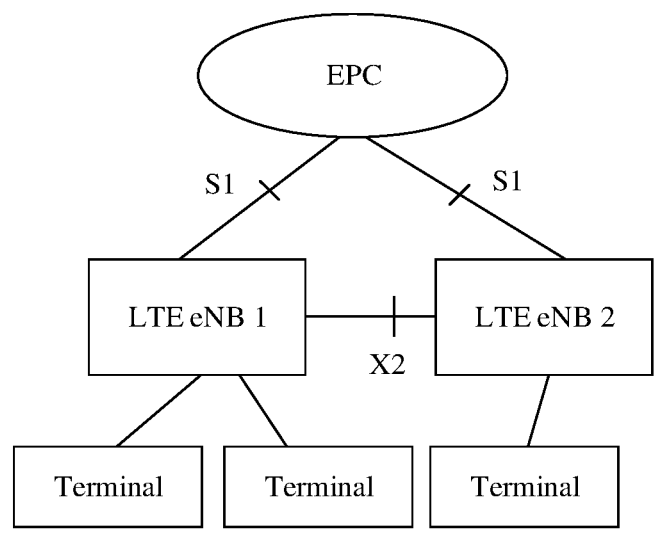
FIG. 1 to FIG. 4 each are a schematic diagram of a communications system according to an embodiment of this application.

The technical solutions in the embodiments of this application could be applied to various communications systems, for example, a global system for mobile communications (GSM), an evolved universal terrestrial radio access (E-UTRA) system, a universal mobile telecommunications system (UMTS) and an evolved version of the UMTS, a long term evolution (LTE) communications system and various versions based on LTE evolution, a 5th generation (5G) communications system, and a next generation communications system such as a new radio (NR) communications system. In addition, the communications systems may further use a future-oriented communications technology, and use the technical solutions provided in the embodiments of this application.

It should be noted that, in the embodiments of this application, the word such as "example" or "for example" is used to represent giving an example, an illustration, or a description. Any embodiment or design solution described by using "example" or "for example" in the embodiments of this application shall not be construed as being more preferred or more advantageous than another embodiment or design solution. Exactly, use of the word such as "example" or "for example" is intended to present a relative concept in a specific manner.

In this application, "at least one" means one or more, and "a plurality of" means two or more. The term "and/or"

describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including a singular item (piece) or any combination of a plurality of items (pieces). For example, at least one of a, b, or c may indicate: a; b; c; a and b; a and c; b and c; or a, b, and c; where a, b, and c may be singular or plural. In the embodiments of this application, A or B may indicate a case in which only A exists, both A and B exist, and only B exists, where A and B may be singular or plural.

In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

A system architecture and a service scenario described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

In a current 4G network, an evolved NodeB (eNB) in an LTE system (which may be referred to as an LTE eNB) is connected to a 4G core network (for example, an evolved packet core (EPC)) through an S1 interface, and different LTE eNBs are connected to each other through an X2 interface. For example, in FIG. 1, an LTE eNB 1 and an LTE eNB 2 are connected through an X2 interface. FIG. 1 shows a network architecture of an LTE system, where the X2 interface supports direct transmission of data and signaling between the two LTE eNBs.

For example, the X2 interface is further classified into two interfaces, for example, an X2-C interface and an X2-U interface. The X2-C interface is used for a control plane, and the X2-U interface is used for a user plane. The X2-C interface is configured to transmit the signaling between the LTE eNBs. The X2-U interface is configured to transmit the data between the LTE eNBs.

In LTE, a terminal transmits data or signaling with an EPC through an LTE eNB accessed by the terminal.

With continuous development of mobile communications technologies, a 4G network gradually evolves to a 5G network. During the evolution, the LTE system can evolve into an eLTE system.

Figure 2:
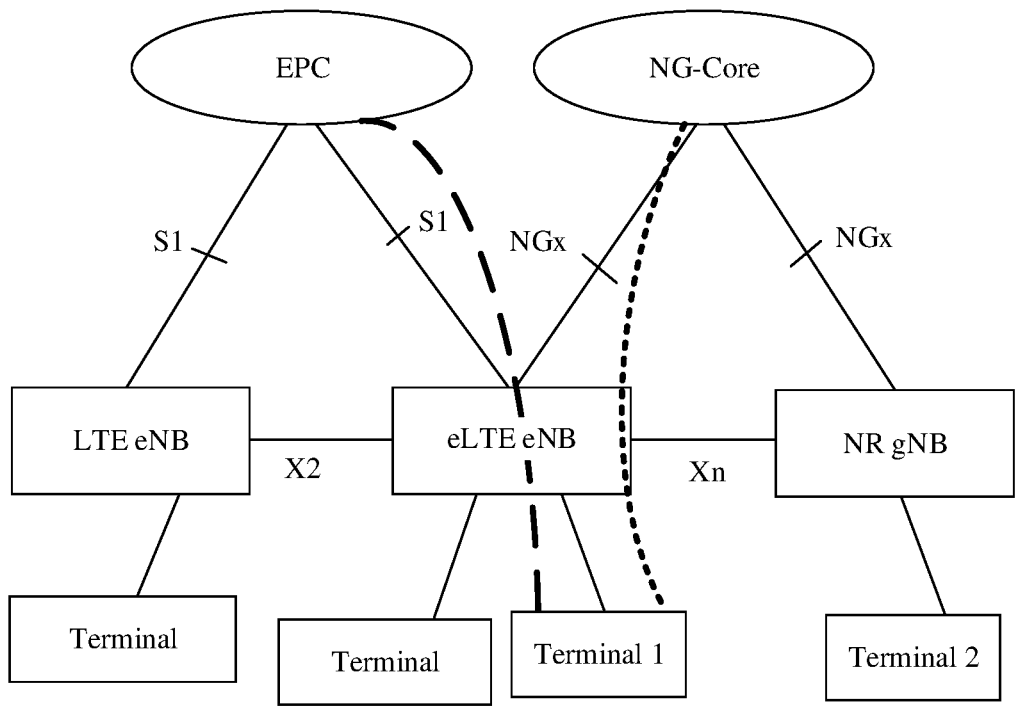

In the eLTE system, an EPC network and a next-generation core (NG-Core) network coexist. An eNB in the eLTE system is referred to as an eLTE eNB, and terminals having a function of accessing the NG-Core network are referred to as next-generation terminals (for example, a terminal 1 and a terminal 2 in the figure). The eLTE eNB can access the EPC network or the NG-Core network. The terminal 1 that is connected to the eLTE eNB in a wireless manner can access the EPC network or the NG-Core network through the eLTE eNB. As shown in FIG. 2, the eLTE eNB is connected to the EPC network through an S1 interface, or may be connected to the NG-Core network through another corresponding interface (which is represented by using NG in FIG. 2). The terminal 1 that is connected to the eLTE eNB can access the EPC network or the NG-Core network through the eLTE eNB. A terminal connected to the eLTE eNB can access the EPC network through the LTE eNB. In FIG. 2, an NR gNB is used to represent a gNodeB that accesses only the NG-Core network, the LTE eNB is connected to the eLTE eNB through an X2 interface, and the eLTE eNB is connected to the NR gNB through an Xn interface.

Figure 3:
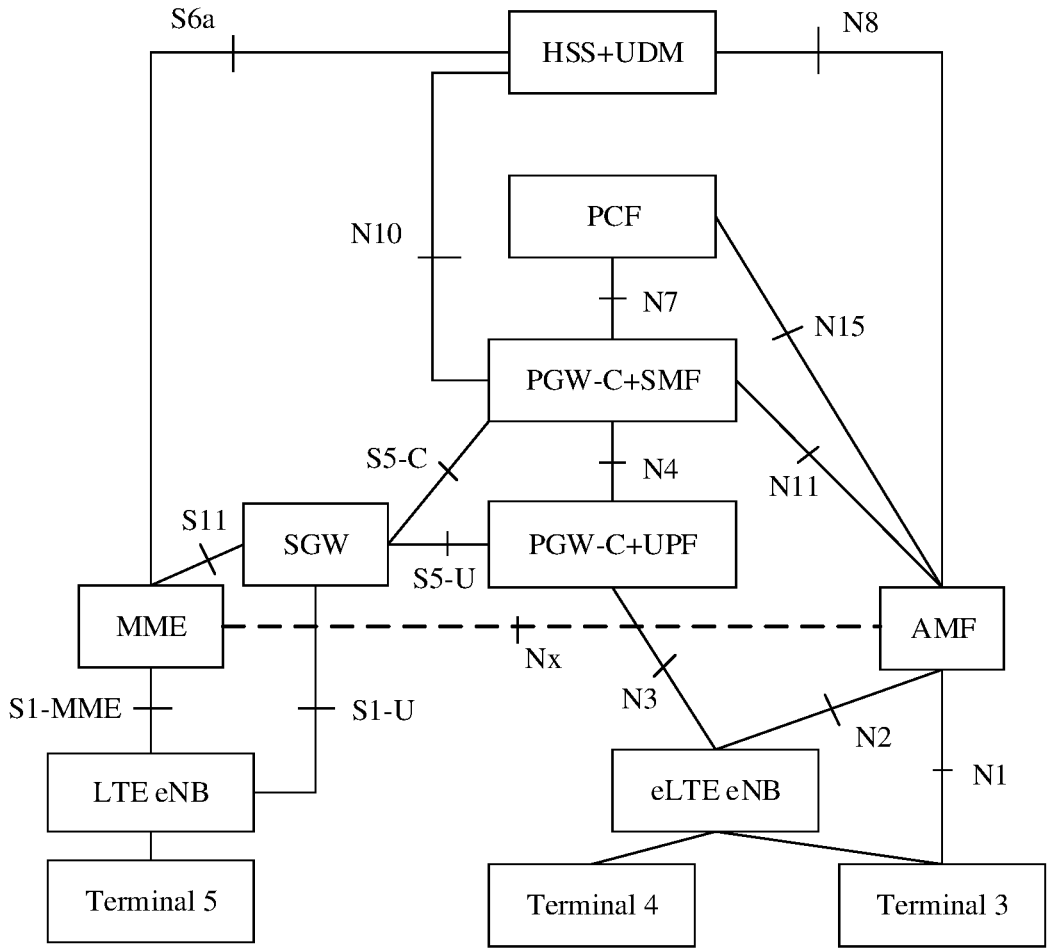

A core network device in the 4G network and a core network device in the 5G network may be interworked (interworking). With reference to FIG. 2, FIG. 3 shows a composition structure of each device in a communications system in a 5G network in a scenario in which a core network device in a 4G network interworks with a core network device in the 5G network.

The core network device has a user plane function and a control plane function. Generally, a user plane network element is used to represent a device that can implement the user plane function of the core network device, and a control plane network element is used to represent a device that can implement the control plane function of the core network device. The user plane network element and the control plane network element may be integrated into a same device, or may be disposed independently. In this embodiment of this application, an example in which the user plane network element and the control plane network element are independently disposed is used for description.

In FIG. 3, a home subscriber server (HSS) in the 4G network and a unified data management (UDM) network element in the 5G network are integrated in a same device, a control plane PGW-C network element of a public data network gateway (PGW) in the 4G network and a session management function (SMF) network element in the 5G network are integrated into a same device, and a PGW-U network element in the 4G network and a user plane function (UPF) network element in the 5G network are integrated into a same device. A mobility management entity (MME) in FIG. 3 is a control plane network element in the 4G network, and the MME is connected to an LTE eNB through an S1-MME interface. A core access and mobility management function (AMF) network element is a control plane network element in the 5G network. The AMF network element is connected to an NR gNB/an eLTE eNB through an N2 interface, and is connected to a terminal 3 through an N1 interface. The MME and the AMF network element may be connected through an Nx interface, or the Nx interface may not exist. Therefore, a dashed line in FIG. 3 represents the Nx interface. In 5G, the AMF network element is connected to a PCF network element through an N15 interface, and the PGW-C network element and the SMF network element are connected to the PCF network element through an N7 interface. A serving gateway (SGW) is a device that is responsible for processing such as routing and forwarding of a data packet in the 4G network. In addition, related interfaces such as S5-U, S5-C, S11, S1-U, S6a, N1, N2, N3, N4, N7, N8, N10, N11 and N15 are further shown in FIG. 3, and these interfaces are not described in detail herein.

In the current 5G network, in the embodiments of this application, each next generation NodeB (gNB) in an NR system is referred to as an NR gNB, and is connected to an NG-Core network through an N2 interface. Different NR gNBs are connected to each other through an Xn interface.

Figure 4:
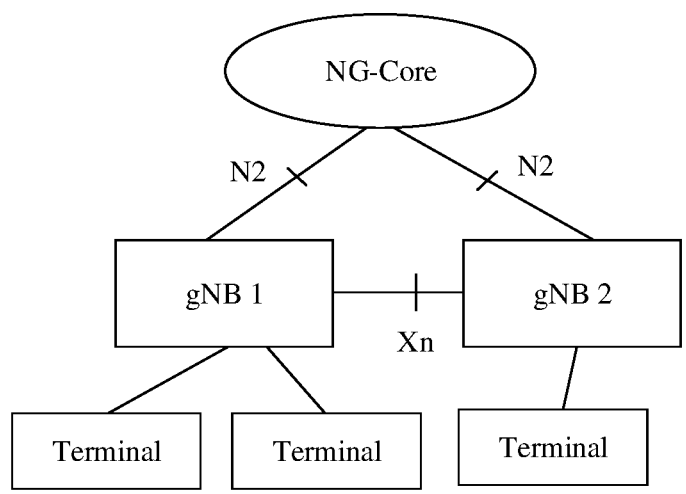

For example, a gNB 1 and a gNB 2 are connected through the Xn interface. Each NR gNB is connected to at least one terminal in the NR system. FIG. 4 shows a network architecture of an NR system. In an actual application, connections between the foregoing plurality of devices are wireless connections. A solid line is used in FIG. 4 to conveniently and intuitively represent a connection relationship between the devices.

Figure 5:
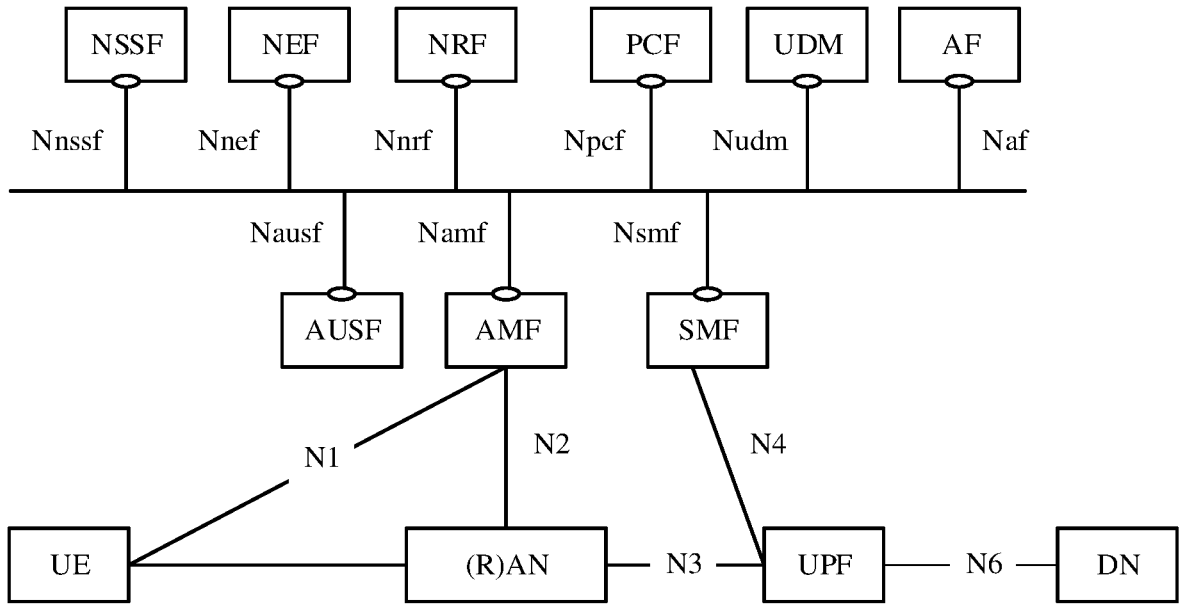
FIG. 5 is a schematic diagram of a 5G communications system according to an embodiment of this application.

If the communications system shown in FIG. 4 is used in a 5G network, as shown in FIG. 5, a network element or an entity corresponding to a gNB may be a RAN, and network elements included in an NG-Core network may be an SMF network element, a UPF network element, a policy control network element (which may be a policy control function (PCF) network element), an application function (AF) network element, an authentication server function (AUSF) network element, a UDM network element, a network exposure function (NEF) network element, a network repository function (NRF) network element, a data network (DN), a security anchor function (SEAF) network element, a network slice selection function (NSSF) network element, and the like. This is not specifically limited in this embodiment of this application.

A terminal communicates with the AMF network element through an N1 interface (N1 for short). The AMF network element communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates with the data network (DN) through an N6 interface (N6 for short). The terminal accesses a network through an access network device (for example, the RAN device). The access network device communicates with the AMF network element through an N2 interface (N2 for short). The SMF network element communicates with the PCF network element through an N7 interface (N7 for short), and the PCF network element communicates with the AF network element through an N5 interface. The access network device communicates with the UPF network element through an N3 interface (N3 for short). Any two or more AMF network elements communicate with each other through an N14 interface (N14 for short). The SMF network element communicates with the UDM network element through an N10 interface (N10 for short). The AMF network element communicates with the AUSF network element through an N12 interface (N12 for short). The AUSF network element communicates with the UDM network element through an N13 interface (N13 for short). The AMF network element communicates with the UDM network element through an N8 interface (N8 for short).

It should be noted that names of the interfaces between the network elements in FIG. 5 are merely examples, and the interfaces may have other names in a specific implementation. This is not specifically limited in the embodiments of this application.

It should be noted that the access device, the AF network element, the AMF network element, the SMF network element, the AUSF network element, the UDM network element, the UPF network element, the PCF network element, and the like in FIG. 5 are merely names, and the names do not constitute any limitation on the devices. In the 5G network and another future network, network elements corresponding to the access network device, the AF network element, the AMF network element, the SMF network element, the AUSF network element, the UDM network element, the UPF network element, and the PCF network element may have other names. This is not specifically limited in the embodiments of this application. For example, the UDM network element may alternatively be replaced with an HSS, a user subscription database (USD), or a database entity. This is uniformly described herein, and details are not described subsequently again.

Figure 6:
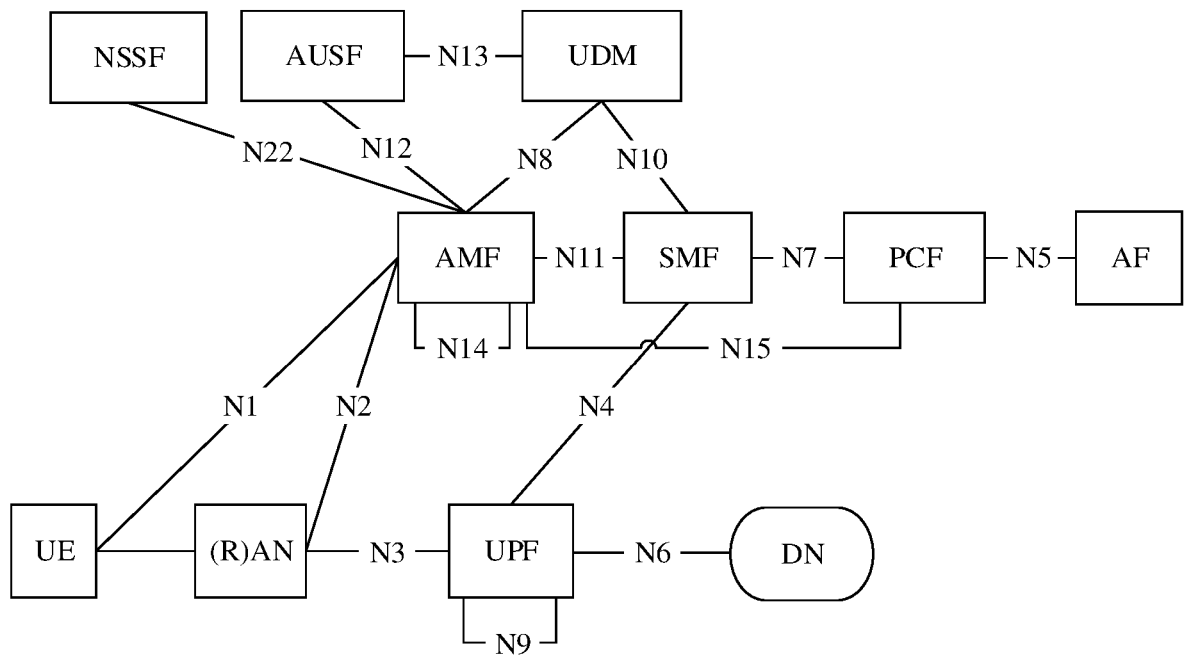
FIG. 6 is another schematic diagram of a 5G communications system according to an embodiment of this application.

FIG. 6 shows a 5G network of a non-roaming architecture based on a service-based interface. Certainly, the 5G network may alternatively use a non-roaming architecture based on a reference point shown in FIG. 6.

An AMF network element is a core network element, and is mainly responsible for signaling processing, for example, functions such as access control, mobility management, attachment and detachment, and gateway selection. When the AMF network element provides a service for a session in a terminal, the AMF network element provides a control plane storage resource for the session, to store a session identifier, an SMF network element identifier associated with the session identifier, and the like.

A radio access network ((R)AN) device includes a RAN device and an AN device. The RAN device is mainly a radio network device defined by the 3rd generation partnership project (3GPP), and the AN may be an access network device defined by non (non)-3GPP.

The RAN device is mainly responsible for functions on an air interface side, such as radio resource management, quality of service (QOS) management, and data compression and encryption. The access network device may include stations in various forms, for example, a macro base station, a micro base station (also referred to as a small cell), a relay station, and an access point. In systems using different radio access technologies, a device having a base station function may have different names. For example, in a 5th generation (5G) system, the device is referred to as a RAN. In an LTE system, the device is referred to as an evolved NodeB (eNB or eNodeB). In a 3rd (3G) system, the device is referred to as a NodeB (Node B), or the like.

The AN device allows interworking between a terminal and a 3GPP core network by using a non-3GPP technology. Non-3GPP technologies include, for example, wireless fidelity (Wi-Fi), worldwide interoperability for microwave access (WiMAX), and code division multiple access (CDMA) networks.

An SMF network element is responsible for user plane network element selection, user plane network element redirection, internet protocol (IP) address assignment, bearer establishment, modification, and release, and QoS control.

A UPF network element is responsible for forwarding and receiving of user data in a terminal. The user data may be received from a data network, and transmitted to the terminal through an access network device. The UPF network element may further receive user data from the terminal through the access network device, and forward the user data to the data network. A transmission resource and a scheduling function in the UPF network element that serves the terminal are managed and controlled by the SMF network element.

A PCF network element mainly supports providing a unified policy framework to control network behavior, and providing a policy rule to a control layer network function, and is responsible for obtaining policy-related subscription information of a subscriber.

An AUSF network element mainly provides authentication and authorization functions.

An NEF network element mainly supports secure interaction between a 3GPP network and a third-party application. The NEF network element can securely open a network capability and an event to a third party, to enhance or improve application service quality. The 3GPP network can also securely obtain related data from the third party, to enhance intelligent decision-making of the network. In addition, the NEF network element supports restoring structured data from a unified data repository or storing structured data in a unified data repository.

A unified data repository (UDR) is mainly responsible for storing structured data. Stored content includes subscription data and policy data, externally exposed structured data, and application-related data.

An AF network element mainly supports interaction with a 3GPP core network to provide a service, for example, affects data routing decision-making or a policy control function, or provides some third-party services to a network side.

A terminal in the embodiments of this application may be a device that provides a user with voice and/or data connectivity, a handheld device with a wireless connection function, or another processing device connected to a wireless modem. A wireless terminal may communicate with one or more core networks through a RAN. The wireless terminal may be user equipment (UE), a handheld terminal, a notebook computer, a subscriber unit, a cellular phone, a smartphone, a wireless data card, a personal digital assistant (PDA) computer, a tablet computer, a wireless modem, a handheld device (handheld), a laptop computer, a cordless phone, a wireless local loop (WLL) station, a machine type communication (MTC) terminal, or another device that can access a network. A terminal and an access network device communicate with each other by using an air interface technology (for example, a 3GPP access technology or a non-3GPP access technology).

Figure 7:
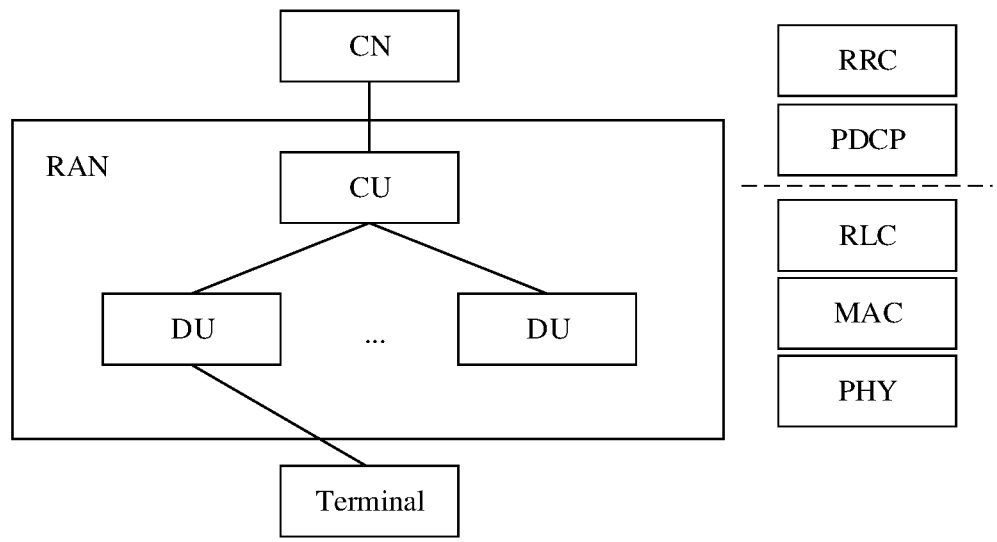
FIG. 7 is a schematic structural diagram of a base station according to an embodiment of this application.

A future access network may be implemented by using a cloud radio access network (C-RAN) architecture. Therefore, in a possible manner, a protocol stack architecture and a function of a conventional base station are divided into two parts: One part is referred to as a central unit (CU), and the other part is referred to as a distributed unit (DU). An actual deployment manner of the CU and the DU is relatively flexible. For example, CUs of a plurality of base stations are integrated to form a function entity with a relatively large scale. FIG. 7 is a schematic diagram of a network architecture according to an embodiment of this application. As shown in FIG. 7, the network architecture includes a core network (CN) device and an access network device (for example, a RAN device). The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, a RAN device (eNB) includes a baseband apparatus and a radio frequency apparatus. The radio frequency apparatus may be remotely arranged relative to the baseband apparatus (for example, a radio remote unit (RRU) is remotely arranged relative to a building baseband unit (BBU)). The RAN device is implemented by one node, and the node is configured to implement functions of protocol layers such as a radio resource control (RRC) layer, a packet data convergence protocol (PDCP) layer, a radio link control (RLC) layer, and a medium access control (MAC) layer. For another example, in an evolved structure, the baseband apparatus may include a CU and DUs, and the plurality of DUs may be controlled by the CU in a centralized manner. As shown in FIG. 7, the CU and the DUs may be divided based on protocol layers of a wireless network. For example, functions of a packet data convergence protocol layer and a protocol layer above the packet data convergence protocol layer are set on the CU, and functions of protocol layers, for example, an RLC layer and a MAC layer, below the PDCP layer, are set on the DUs.

Division based on the protocol layer is merely an example, and division may alternatively be performed at another protocol layer, for example, the RLC layer. Functions of the RLC layer and a protocol layer above the RLC layer are set on the CU, and a function of a protocol layer below the RLC layer are set on the DU. Alternatively, division is performed at a protocol layer, for example, a part of a function of the RLC layer and a function of a protocol layer above the RLC layer are set on the CU, and a remaining function of the RLC layer and a function of a protocol layer below the RLC layer are set on the DU. In addition, division may alternatively be performed in another manner. For example, the division is performed based on a latency. A function whose processing time needs to satisfy a latency requirement is set on the DU, and a function whose processing time does not need to satisfy the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 8:
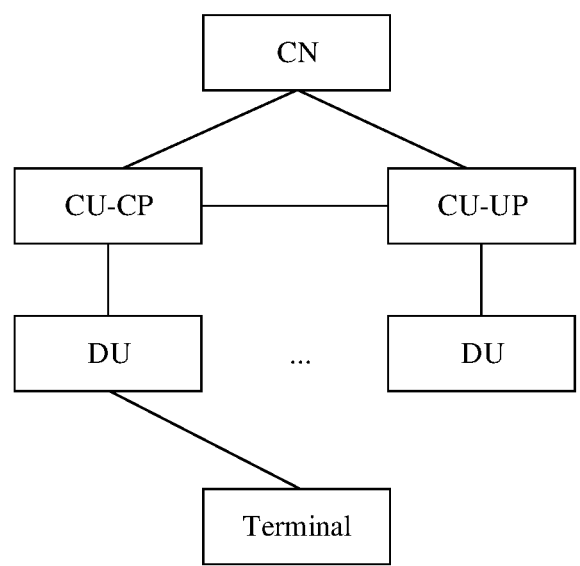
FIG. 8 is another schematic structural diagram of a base station according to an embodiment of this application.

In addition, continue to refer to FIG. 8. Compared with an architecture shown in FIG. 8, a control plane (CP) and a user plane (UP) of a CU may be further separated and implemented by dividing the CU into different entities. The entities are separately a control plane CU entity (CU-CP entity) and a user plane CU entity (CU-UP entity).

In the foregoing network architecture, data generated by the CU may be sent to a terminal through the DU, or data generated by a terminal may be sent to the CU through the DU. The DU may directly encapsulate the data at a protocol layer and then transmit the encapsulated data to the terminal or the CU, without parsing the data. For example, data at the RRC layer or the PDCP layer is finally processed as data at a physical layer (PHY) and sent to the terminal, or is converted from received data at a PHY layer. In this architecture, the data at the RRC layer or the PDCP layer may also be considered as being sent by the DU.

In the foregoing embodiment, the CU is classified as an access network device in a RAN. In addition, the CU may be classified as an access network device in a CN. This is not limited herein.

An apparatus in the following embodiments of this application may be located in a terminal or an access network device based on a function implemented by the apparatus. When the foregoing CU-DU structure is used, the access network device may be a CU node, a DU node, or a RAN device including functions of a CU node and a DU node.

It may be understood that, when the access network device may be divided into a CU or a DU, as shown in FIG. 7, that one access network device covers one or more cells may mean that a CU of the access network device covers one or more cells, or may mean that a DU of the access network device covers one or more cells.

When the access network device may be divided into a CU and a DU, two access network devices communicate with each other through an Xn interface. An interface between a 5G core network (5GC) and each access network device is an NG interface. The NG interface includes a control plane interface and a data plane interface. For example, the control plane interface is an N2 interface, and the data plane interface is an N3 interface.

Figure 9:
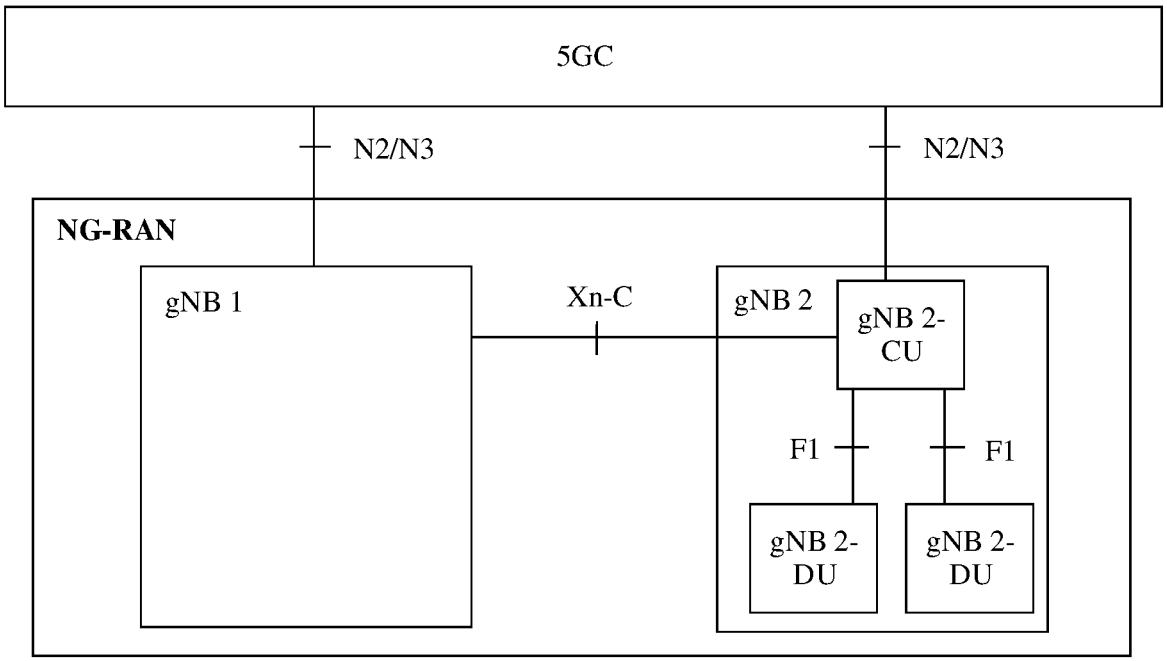
FIG. 9 is another schematic diagram of a communications system according to an embodiment of this application.

As shown in FIG. 9, an example in which the access network device is a gNB is used in FIG. 9. A handover from a gNB 1 to a gNB 2 may be a handover from a CU of the gNB 1 to a CU of the gNB 2, a handover from the gNB 1 to a CU of the gNB 2, a handover from a DU of the gNB 1 to a DU of the gNB 2, or a handover from the gNB 1 to a DU of the gNB 2.

In the communications systems shown in FIG. 2 to FIG. 9, regardless of an LTE eNB, an eLTE eNB, or a gNB, one base station may generally cover one or more cells. Each cell has a specific coverage area, and the coverage area is relatively fixed. In a moving process, if a terminal leaves a serving cell and enters another cell, and the another cell and the serving cell are managed by different base stations (for example, the serving cell belongs to a source base station, and the another cell belongs to a target base station), the terminal needs to hand over from the source base station to the target base station under control of an existing mobility management technology.

A handover procedure based on an Xn interface and a handover procedure based on N2 are defined in an existing handover procedure of the 5th generation mobile communications technology. The Xn interface is an interface between two access network devices, so that the handover procedure based on the Xn interface may be understood as that when a source radio access network (S-RAN) device determines to hand over a terminal between access network devices, the S-RAN device sends a handover request to a target radio access network (T-RAN) device. When the S-RAN device determines that the T-RAN device agrees to hand over the terminal to the T-RAN device, the S-RAN device initiates a handover procedure to the terminal, to hand over the terminal to the T-RAN device. N2 is an interface between an access network device and an AMF network element, so that the handover procedure based on N2 may be understood as that when an S-RAN device determines to hand over a terminal between access network devices, the S-RAN device sends a handover request to an S-AMF network element. After the S-AMF network element selects a T-AMF network element, the T-AMF network element sends the handover request to a T-RAN device. After receiving a handover request acknowledgment from the T-RAN device, the T-AMF network element sends the handover request acknowledgment to the S-RAN device through the S-AMF network element. When the S-RAN device determines that the T-RAN device agrees to hand over the terminal to the T-RAN device, the S-RAN device initiates a handover procedure to the terminal, to hand over the terminal to the T-RAN device.

Regardless of the handover procedure based on N2 or the handover procedure based on the Xn interface, before determining to perform the handover procedure (that is, sending a handover command to the terminal), the S-RAN device needs to send a downlink data packet to the terminal.

In the handover procedure, the S-RAN device may need to send a data packet of the terminal to the terminal. Therefore, in the current handover procedure, when determining to perform the handover, the S-RAN device continues to send the data packet of the terminal until the S-RAN device sends the handover command to the terminal. However, after the S-RAN device determines to hand over the terminal between the access network devices, communication quality of an air interface may become very poor. If the S-RAN device still sends the data packet to the terminal in this process, it is possible that the terminal cannot receive the data packet sent by the S-RAN device due to poor communication quality. Therefore, reliability of the data packet is reduced. In addition, the S-RAN device sends the data packet to the T-RAN device only after sending the handover command to the terminal. This causes a latency.

Based on this, an embodiment of this application provides a communication method. In the method, a source access network device replicates a data packet (for example, a source data packet) of a terminal before sending a handover command to the terminal, to obtain a replicated data packet. Then, the source access network device sends the replicated data packet to a target access network device selected for the terminal. In addition, the source access network device further needs to continue to send the source data packet to the terminal. Before the terminal successfully hands over from the source access network device to the target access network device, the source access network device still needs to send the source data packet to the terminal. After the terminal successfully hands over from the source access network device to the target access network device, the target access network device may send, to the terminal, the replicated data packet obtained based on the source data packet. In this way, it can be ensured that when the terminal cannot receive the source data packet from the source access network device in a handover procedure, the terminal can further obtain the replicated data packet from the target access network device, thereby ensuring data transmission reliability. In addition, because the data packet is sent to the target access network device before the handover command is sent to the terminal, compared with a current technology in which the data packet of the terminal is sent to the target access network device only after the handover command is sent to the terminal, a latency can further be reduced.

It should be noted that mutual reference may be made between the embodiments of this application. For example, for same or similar steps, mutual reference may be made between the method embodiments and the apparatus embodiments. This is not limited.

Figure 10:
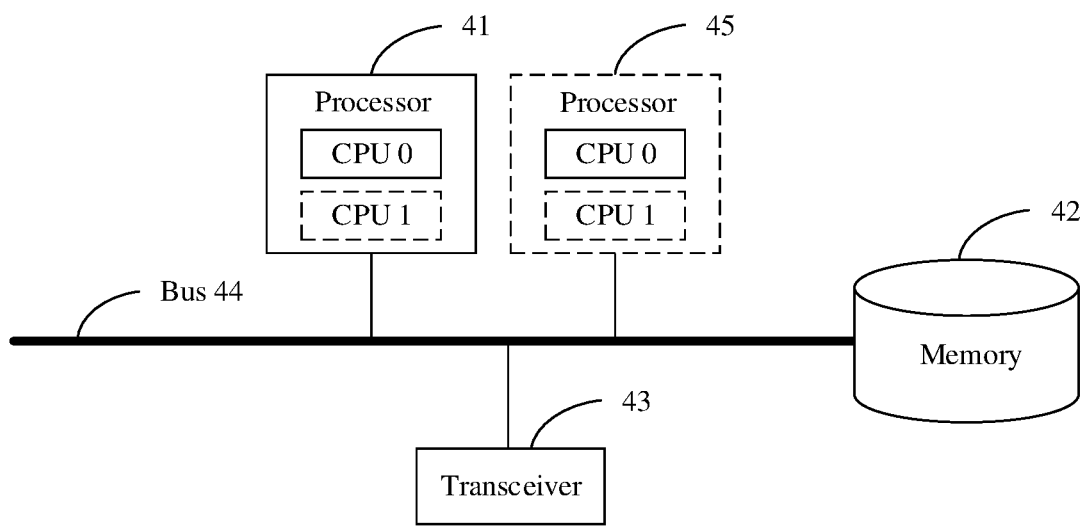
FIG. 10 is a schematic structural diagram of an access network device according to an embodiment of this application.

FIG. 10 is a schematic composition diagram of an access network device according to an embodiment of this application. For a source access network device and a target access network device, refer to a structure of the access network device shown in FIG. 10. As shown in FIG. 10, the access network device may include at least one processor 41 and a memory 42.

The following describes each component of the access network device in detail with reference to FIG. 10.

The processor 41 is a control center of the access network device, and may be one processor, or may be a collective term for a plurality of processing elements. For example, the processor 41 is a CPU or an application-specific integrated circuit (ASIC), or is configured as one or more integrated circuits, for example, one or more microprocessors (DSP) or one or more field programmable gate arrays (FPGA), implementing the embodiments of this application.

The processor 41 may run or execute a software program stored in the memory 42 and invoke data stored in the memory 42, to perform various functions of the access network device, for example, perform actions of the source access network device or the target access network device in the method embodiments of this application.

During specific implementation, in an embodiment, the processor 41 may include one or more CPUs, for example, a CPU 0 and a CPU 1 shown in the FIG. 10.

During specific implementation, in an embodiment, the access network device may include a plurality of processors, for example, the processor 41 and a processor 45 in FIG. 10. Each of the processors may be a single-core (single-CPU) processor or may be a multi-core (multi-CPU) processor. The processor herein may refer to one or more devices, circuits, and/or processing cores configured to process data (for example, computer program instructions).

The memory 42 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), or a magnetic disk storage medium or another magnetic storage device, or any other medium that is capable of carrying or storing expected program code in a form of an instruction or a data structure and that can be accessed by a computer. However, the memory 42 is not limited thereto.

Optionally, the access network device further includes a bus 44. The memory 42 may exist independently and is connected to the processor 41 through the bus 44. The memory 42 may alternatively be integrated with the processor 41.

The memory 42 is configured to store the software program for executing the solutions of this application.

Optionally, the access network device further includes a transceiver 43.

The transceiver 43 is configured to communicate with another device or a communications network, for example, is configured to communicate with a terminal, a core network device (for example, an AMF network element, an SMF network element, or a UPF network element), an ethernet, a RAN, or a wireless local area network (WLAN). The transceiver 43 may include all or a part of a baseband processor, and may further optionally include an RF processor. The RF processor is configured to send and receive an RF signal. The baseband processor is configured to process a baseband signal converted from the RF signal or a baseband signal to be converted into the RF signal.

The bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

The device structure shown in FIG. 10 does not constitute any limitation on the access network device, and the access network device may include components more or fewer than those shown in the figure, or some components may be combined, or may have different component arrangements.

It should be understood that the access network device in the embodiments of this application may be a RAN device or an AN device.

It should be understood that a communication method in the embodiments of this application may be performed by a source (or target) access network device, or may be performed by a chip used in the source (or target) access network device. This is not limited in the embodiments of this application. The following uses an example in which a communication method is performed by a source access network device and a target access network device.

Figure 11:
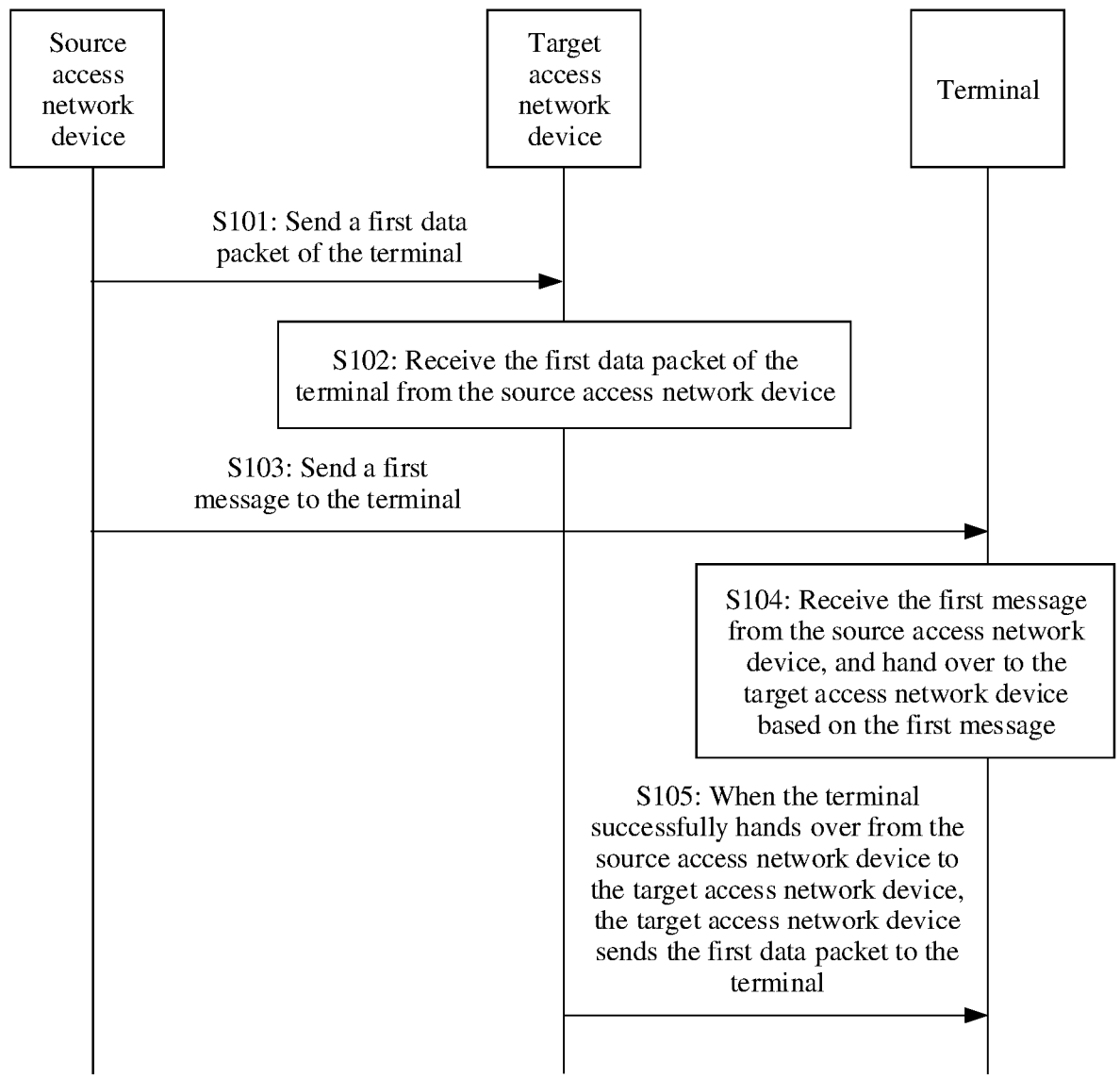
FIG. 11 is a first schematic flowchart of a communication method according to an embodiment of this application.

As shown in FIG. 11, an embodiment of this application provides a communication method. The method includes the following steps.

S101: A source access network device sends a first data packet of a terminal to a target access network device.

It should be understood that the source access network device is an access network device accessed by the terminal before a handover, and the target access network device is an access network device that is selected by the source access network device to serve the terminal after the handover.

The first data packet may include a downlink data packet that is of the terminal and that is processed by the source access network device in the handover procedure of the terminal. The downlink data packet of the terminal may be a data packet that is received by the source access network device from a core network and that is sent to the terminal in the handover procedure of the terminal, may be a data packet to be sent by the source access network device to the terminal in the handover procedure of the terminal, may be a data packet sent by the source access network device to the terminal in the handover procedure of the terminal, or may be a data packet obtained by the source access network device by replicating a data packet (referred to as a replicated data packet for short) that needs to be sent to the terminal in the handover procedure. This is not limited.

In addition, the first data packet may include one or more (two or more) downlink data packets of the terminal.

For example, when there is one data packet to be sent to the terminal, the first data packet is the data packet to be sent to the terminal. When there are a plurality of data packets to be sent to the terminal, the source access network device may send, to the target access network device in batches, the plurality of data packets to be sent to the terminal. In this case, the first data packet may be a first batch of data packets to be sent by the source access network device to the target access network device, and the first data packet may be a data packet obtained by re-encapsulating two or more data packets of the plurality of data packets to be sent to the terminal, or may be any one of the plurality of data packets to be sent to the terminal. For example, the data packets to be sent to the terminal include a data packet 1 to a data packet 15. The first data packet may be the data packet 1 to the data packet 5.

Example 1: The source access network device may be the LTE eNB 1 in the system shown in FIG. 1, and the target access network device may be the LTE eNB 2 in the system shown in FIG. 1. Alternatively, the source access network device may be the LTE eNB in the system shown in FIG. 2, and the target access network device may be the eLTE eNB in the system shown in FIG. 2. In this case, the source access network device may send the first data packet to the target access network device through an X2 interface.

Example 2: The source access network device may be the eLTE eNB in the system shown in FIG. 2, and the target access network device may be the NR gNB in the system shown in FIG. 2. Alternatively, the source access network device may be the gNB 1 in the system shown in FIG. 4, and the target access network device may be the gNB 2 in the system shown in FIG. 4. In this case, the source access network device may send the first data packet to the target access network device through an Xn interface.

Example 3: If there is no Xn/X2 interface between the source access network device and the target access network device, the source access network device may directly transmit the first data packet to the target access network device. For example, a tunnel is established between the source access network device and the target access network device. The source access network device transmits the first data packet to the target access network device through the tunnel established to the target access network device. Alternatively, the source access network device sends the first data packet to a source UPF network element corresponding to the source access network device, the source UPF network element sends the first data packet to a target UPF network element, and then the target UPF network element forwards the first data packet to the target access network device. If the source UPF network element and the target UPF are a same UPF, the source UPF network element may directly send the first data packet to the target access network device.

Certainly, the source access network device may alternatively be the CU or the DU of the gNB 1 shown in FIG. 9, and the target access network device may alternatively be the CU or the DU of the gNB 2 shown in FIG. 9. This is not limited in this embodiment of this application.

For example, the downlink data packet of the terminal in this embodiment of this application may be obtained from the core network corresponding to the source access network device. For a specific obtaining process, refer to descriptions in a current technology. Details are not described herein.

Figure 12:
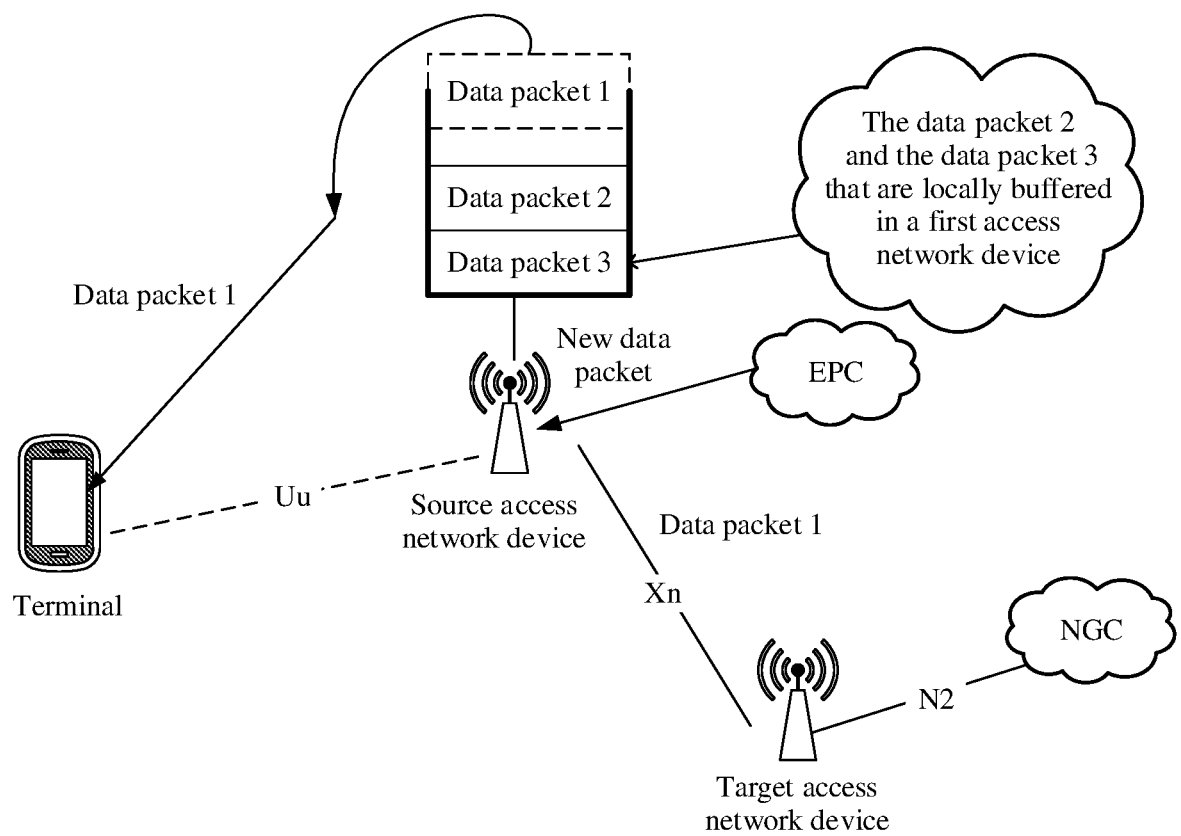
FIG. 12 is a schematic diagram of data packet sending according to an embodiment of this application.

For example, as shown in FIG. 12, the downlink data packet of the terminal includes a downlink data packet (for example, the data packet 2 and the data packet 3) that is of the terminal and that is buffered in a buffer of the source access network device (which is referred to as a buffered data packet for short), a new data packet that is of the terminal and that is received by the source access network device from a UPF network element (which is referred to as a new data packet for short), and a replicated data packet of the terminal (refer to the foregoing descriptions). For example, the replicated data packet may be a data packet obtained by replicating the data packet 1.

For example, the buffered data packet may usually refer to a layer 2 data packet, and a PDCP header has been encapsulated in the data packet. The new data packet is a data packet in which no PDCP header is encapsulated, for example, an IP packet. The replicated data packet mainly refers to a data packet that has been sent to the terminal by the source access device, or a data packet that is to be sent to the terminal.

It should be understood that, after the source access network device sends a data packet to the terminal, the source access network device has a replicated data packet of the data packet but does not have the data packet.

It may be understood that the data packet 1 and the replicated data packet are a same data packet.

S102: The target access network device receives the first data packet of the terminal from the source access network device.

It should be understood that, for an interface through which the target access network device receives the first data packet of the terminal, refer to a network in which the source access network device and the target access network device are located. Details are not described herein again. For example, if the source access network device sends the first data packet to the target access network device through the Xn interface, the target access network device may receive the first data packet through the Xn interface.

S103: When the source access network device determines that the target access network device has received the first data packet, the source access network device sends a first message to the terminal.

The first message is used to indicate the terminal to hand over to the target access network device.

It should be noted that S103 may be replaced with the following process: The source access network device determines that the target access network device has received the first data packet, and the source access network device sends the first message to the terminal. Alternatively, S103 may be replaced with the following: When the source access network device receives a second message from the target access network device, the source access network device sends the first message to the terminal; when the source access network device determines, based on latency information, that the target access network device has received the first data packet, or after the source access network device receives a second message from the target access network device, the source access network device sends the first message to the terminal.

For example, the first message may be a handover command, and the first message carries at least identification information of the target access network device. The identification information of the target access network device is used to identify the target access network device.

Optionally, in some embodiments, the method provided in this embodiment of this application further includes the following steps.

S104: The terminal receives the first message from the source access network device, and hands over to the target access network device based on the first message.

It should be understood that, after receiving the first message from the source access network device, the terminal may hand over from the source access network device to the target access network device.

Specifically, the first message may carry a target cell identifier, and the terminal accesses a target cell, so that the terminal hands over to the target access network device. The target cell is a cell of the target access network device. The target cell identifier may be sent by the target access network device to the source access network device. For details, refer to descriptions in a current technology. Details are not described.

The first message may be the handover command.

S105: When the terminal successfully hands over from the source access network device to the target access network device, the target access network device sends the first data packet to the terminal.

For example, S105 may be replaced in the following manner: The target access network device determines that the terminal successfully hands over from the source access network device to the target access network device, and the target access network device sends the first data packet to the terminal.

It should be understood that, after S105, the method may further include: receiving, by the terminal, the first data packet from the target access network device.

It should be noted that, when the first data packet in step 101 includes a plurality of downlink data packets of the terminal, the first data packet to be sent to the terminal in step 105 may be sent to the terminal for a plurality of times. For example, the plurality of downlink data packets are re-encapsulated into at least two downlink data packets and sent to the terminal. Specifically, the plurality of downlink data packets may be sent to the terminal in batches; or the first data packet may be sent to the terminal once. This is not limited.

In this embodiment of this application, before the source access network device sends the first message to the terminal, the source access network device needs to send, to the terminal, the data packet that needs to be sent to the terminal in the handover procedure. In this way, before handing over to the target access network device, the terminal may obtain, from the source access network device, the data packet to be sent to the terminal in the handover procedure. After the terminal hands over to the target access network device, the terminal may obtain, from the target access network device, the data packet to be sent to the terminal. On the one hand, if the terminal does not correctly receive a data packet from the source access network device (for example, the terminal does not correctly parse the data packet or fails to receive the data packet due to poor air interface quality), the terminal may further receive the same data packet from the target access network device. On the other hand, if the terminal correctly receives a data packet from the source access network device, the terminal further receives the same data packet from the target access network device. In this case, the terminal may discard a repeated data packet based on an SN of the data packet, that is, reserve one data packet having the same SN. Alternatively, if the terminal determines that an SN already exists, the terminal may discard a newly received data packet having the SN.

According to the communication method provided in this embodiment of this application. In the process in which the terminal hands over to the target access network device (that is, before the source access network device sends the first message to the terminal), the source access network device still needs to send the first data packet to the terminal. If signal quality of an air interface is poor in the handover procedure, the terminal may not receive the first data packet. Therefore, the source access network device sends the first data packet to the target access network device. In this way, when determining that the target access network device has received the first data packet, the source access network device sends, to the terminal, the first message for indicating the terminal to hand over to the target access network device. On the one hand, the target access network device is enabled to have the first data packet. On the other hand, after determining that the target access network device has received the first data packet, the source access network device sends the first message to the terminal, so that after the terminal successfully hands over from the source access network device to the target access network device, the target access network device sends the first data packet to the terminal. In this way, it can be ensured that when the terminal cannot receive the first data packet from the source access network device in the handover procedure, the terminal can further obtain the first data packet from the target access network device, thereby ensuring data transmission reliability. In addition, because the data packet is sent to the target access network device before the handover command is sent to the terminal, compared with a current technology in which the data packet of the terminal is sent to the target access network device only after the handover command is sent to the terminal, a latency can further be reduced.

To ensure reliability of the data packet received by the terminal, the first data packet includes the replicated data packet. In an implementation scenario of the foregoing embodiment, the method may further include: obtaining, by the source access network device, the replicated data packet; or when a condition under which the terminal hands over between the access network devices is satisfied, obtaining, by the source access network device, the replicated data packet.

For example, the source access network device may specifically obtain the replicated data packet in the following manner 1 or manner 2.

Manner 1: The source access network device replicates a data packet satisfying a preset condition in at least one data packet of the terminal, to obtain the replicated data packet. To be specific, in the handover procedure, when the source access network device determines that a data packet satisfies the preset condition, the source access network device replicates the data packet satisfying the preset condition, to obtain the replicated data packet.

It should be noted that the data packet of the terminal in the embodiments of this application may be the downlink data packet of the terminal in step S101. Details are not described again.

The source access network device in this embodiment of this application has the preset condition. In an example, the preset condition may be preconfigured in the source access network device. In another example, the preset condition may be configured by a core network device for the source access network device. This is not limited in this embodiment of this application.

For example, the data packet satisfying the preset condition includes at least one of the following cases: a data packet using a preset QoS flow, a data packet on a preset packet data unit (PDU) session, a data packet whose packet loss rate is less than or equal to a preset threshold, or a data packet on a preset radio bearer.

Optionally, the data packet satisfying the preset condition further includes a data packet using a preset service type and a data packet whose reliability requirement is greater than or equal to a second preset threshold. The second preset threshold is used to distinguish itself from the preset threshold. That a packet loss rate is less than or equal to the preset threshold may also be described as "a packet loss rate requirement is less than or equal to the preset threshold".

In this case, the source access network device may enable a replication function for a specific data packet, to satisfy a QoS requirement of a service corresponding to the data packet. In this case, a QoS guarantee capability of the corresponding service or data packet can be ensured. For example, a QoS assurance capability for data transmission of a specified service of the terminal may be improved.

The following separately describes different cases in which the data packet satisfies the preset condition.

Case (1): Data packet on the radio bearer (a radio bearer granularity)

The preset radio bearer may alternatively be at least one of one or more radio bearers (RB) of the terminal. The RB may be a signaling radio bearer (SRB) or a data radio bearer (DRB).

In this case, the source access network device replicates all data packets carried on the preset radio bearer. The source access network device may determine, based on an identifier of the terminal and an identifier of a radio bearer of the terminal that are carried in a data packet, whether the data packet is a data packet carried on the preset radio bearer. Alternatively, the source access network device may determine, based on a tunnel endpoint identifier (TEID) that is of a GTP tunnel and that is carried in a data packet (or based on a TEID that is of a general packet radio service tunneling protocol (GTP) tunnel and that is carried in a data packet and an identifier such as an IP address of the source access network device), whether the data packet is a data packet carried on the preset radio bearer. Alternatively, the source access network device may determine, by using an identifier of the terminal and a TEID of a GTP tunnel, whether a data packet is a data packet carried on the preset radio bearer.

For example, the preset radio bearer may be a radio bearer corresponding to a service having a relatively high reliability requirement, or the preset radio bearer may be some preset radio bearers.

For example, if a DRB 1 of the terminal corresponds to a service having a relatively high reliability requirement, the preset radio bearer may be the DRB 1. Referring to FIG. 1, if the source access network device determines that a data packet 1 is transmitted by using the DRB 1, the source access network device replicates the data packet 1.

Case (2): Data packet on the preset packet data unit PDU session (a PDU session granularity)

A PDU session is a group of QoS flows established on a terminal in a 5G network. The QoS flows have a same IP address and a same data network name (DNN). On a terminal side and a network side, a PDU session is identified by using an IP address and a DNN.

Each PDU session has a unique identifier. The unique identifier of the PDU session may be one of the following: a PDU session identifier, an APN, an identifier of a user-plane core network device, an address (for example, an IP address) of a user-plane core network device, or an IP address allocated by a user-plane core network device to the terminal.

The preset packet data unit PDU session may be one or more PDU sessions. In this case, the source access network device replicates all data packets carried on the preset packet data unit PDU session. The source access network device may determine, based on a TEID that is of a GTP tunnel and that is carried in a data packet (or based on a TEID that is of a GTP tunnel and that is carried in a data packet and an identifier such as an IP address of the source access network device), whether the data packet is a data packet on the preset packet data unit PDU session. Alternatively, the source access network device may determine, based on an identifier of the terminal and a TEID of a GTP tunnel that are carried in a data packet, whether the data packet is a data packet on the preset packet data unit PDU session. For example, the TEID may be included in a GTP layer protocol header of the data packet.

It should be understood that one terminal may have a plurality of PDU sessions, for example, a PDU session 1, a PDU session 2, and a PDU session 3. If preset packet data unit PDU sessions are the PDU session 1 and the PDU session 2, the source access network device replicates all data packets carried on the PDU session 1 and the PDU session 2.

Case (3): Data packet using the preset quality of service QoS flow (a QoS flow granularity)

A QOS flow is a data flow that has a same QoS requirement in a PDU session. The QoS flow may be a plurality of IP flows having a same QoS requirement.

In this case, a quality of service flow identity (QFI) may be obtained by parsing header information at a GTP layer, or a QFI of a QoS flow may be obtained through parsing at a service data adaptation protocol (SDAP) layer. The SDAP layer indicates a service adaptation layer, and the SDAP layer has at least one of the following capabilities: adding, to a data packet, routing information that can be identified by an access network device; selecting a routing based on the routing information; adding, to the data packet, identification information that can be identified by the access network device and that is related to a QoS requirement; performing QoS mapping on a plurality of links including a wireless backhaul node for the data packet; adding data packet type indication information to the data packet; and sending flow control feedback information to a node having a flow control capability.

The preset QoS flow may be one or more QoS flows. In this case, the source access network device replicates all data packets using the preset QoS flow. The source access network device may determine, based on a QFI in a data packet, whether the data packet is using the preset QoS flow. For example, the QFI may be included in a GTP layer protocol header of the data packet.

For example, if a required QoS flow and a quality of service flow indicated by a QFI carried in a data packet are the same, or fall within a range of the required QoS flow, the terminal determines that the data packet is a data packet using the preset QoS flow.

In the case (2) and the case (3), the source access network device may determine reliability of a service based on a reliability requirement of the service. The reliability of the service may include a latency, a packet loss rate, jitter, and the like of the service. The source access network device may replicate a data packet of a service having a relatively high reliability requirement. In this case, a service corresponding to the preset PDU session in the case (2) is a service having a relatively high reliability requirement, and a service corresponding to the preset QoS flow in the case (3) is a service having a relatively high reliability requirement.

Case (4): Data packet whose packet loss rate is less than or equal to the preset threshold (a data packet granularity)

In this case, the data packet usually carries information used to indicate the packet loss rate. If the source access network device determines that the information that is used to indicate the packet loss rate and that is in a received data packet indicates that the packet loss rate of the data packet is less than or equal to the preset threshold, the source access network device replicates the data packet.

Case (5): Data packet of a preset service type

A service of the preset service type may be a service having a relatively high reliability requirement, for example, may be an ultra-reliable low-latency communication (URLLC) service. In this case, the data packet may be a data packet of the URLLC service.

For example, a data packet may carry information used to indicate a service type of the data packet. If the service type indicated by the information is the URLLC service, the source access network device replicates the data packet.

Case (6): Data packet whose reliability requirement is greater than or equal to the second preset threshold Reliability of a data packet may be understood as reliability of a service to which the data packet belongs. The second preset threshold may be preset, or may be determined by the source access network device according to a preset rule.

It should be noted that, that a data packet satisfies the preset condition may further include the foregoing cases (in other words, when the data packet satisfies the conditions shown in the foregoing cases, the data packet satisfies the preset condition). For example, the data packet satisfies the condition in any one of (1), (4), and (5), and the data packet further satisfies the condition in either of (2) and (3).

Manner 2: The source access network device replicates a data packet of the terminal to obtain the replicated data packet.

The manner 2 is an implementation using the terminal as a granularity. In this case, the source access network device replicates the data packet of the terminal. For example, the source access network device may identify the data packet of the terminal based on an identifier that is of the terminal and that is carried in the data packet, and replicate the identified data packet.

In addition, a core network device may indicate the source access network device to replicate the data packet of the terminal in the handover procedure. Specifically, the core network device may indicate the source access network device to replicate a data packet of a terminal of a specific type in the handover procedure.

The foregoing mainly describes the granularity of replicating the data packet by the source access network device. On the one hand, the source access network device may select, as required, the granularity of replicating the data packet. On the other hand, the source access network device may determine, based on a QoS requirement of a service, or based on default radio bearer information of a session, or as indicated by the core network, the granularity of replicating the data packet. For example, if the core network indicates to replicate the data packet at the granularity of the terminal, the source access network device replicates all data packets of the terminal to obtain replicated data packets. For example, if a QoS flow of a service satisfies a specific QOS requirement, the source access network device determines the QoS flow as the preset QoS flow. Then, all data packets using the preset QoS flow are replicated to obtain replicated data packets.

It should be noted that, when determining the data packet satisfying the preset condition, the source access network device may replicate all data packets satisfying the preset condition. For example, data packets satisfying the preset condition include a data packet 1 and a data packet 2. In this case, the source access network device replicates the data packet 1 and replicates the data packet 2. Alternatively, when determining the data packet satisfying the preset condition, each time sending one data packet satisfying the preset condition, the source access network device may replicate the data packet satisfying the preset condition. For example, when sending a data packet 1, the source access network device replicates the data packet 1. When sending a data packet 2, the source access network device replicates the data packet 2.

The replicated data packet may be first buffered in the source access network device before being sent to the target access network device.

The data packet of the terminal may include a replicated data packet obtained after replicating a data packet received from the core network. In this case, the replicated data packet does not include a sequence number (SN). Alternatively, the data packet of the terminal may include a replicated data packet obtained after replicating a data packet sent by the source access network device to the terminal. In this case, the replicated data packet includes an SN.

Figure 13:
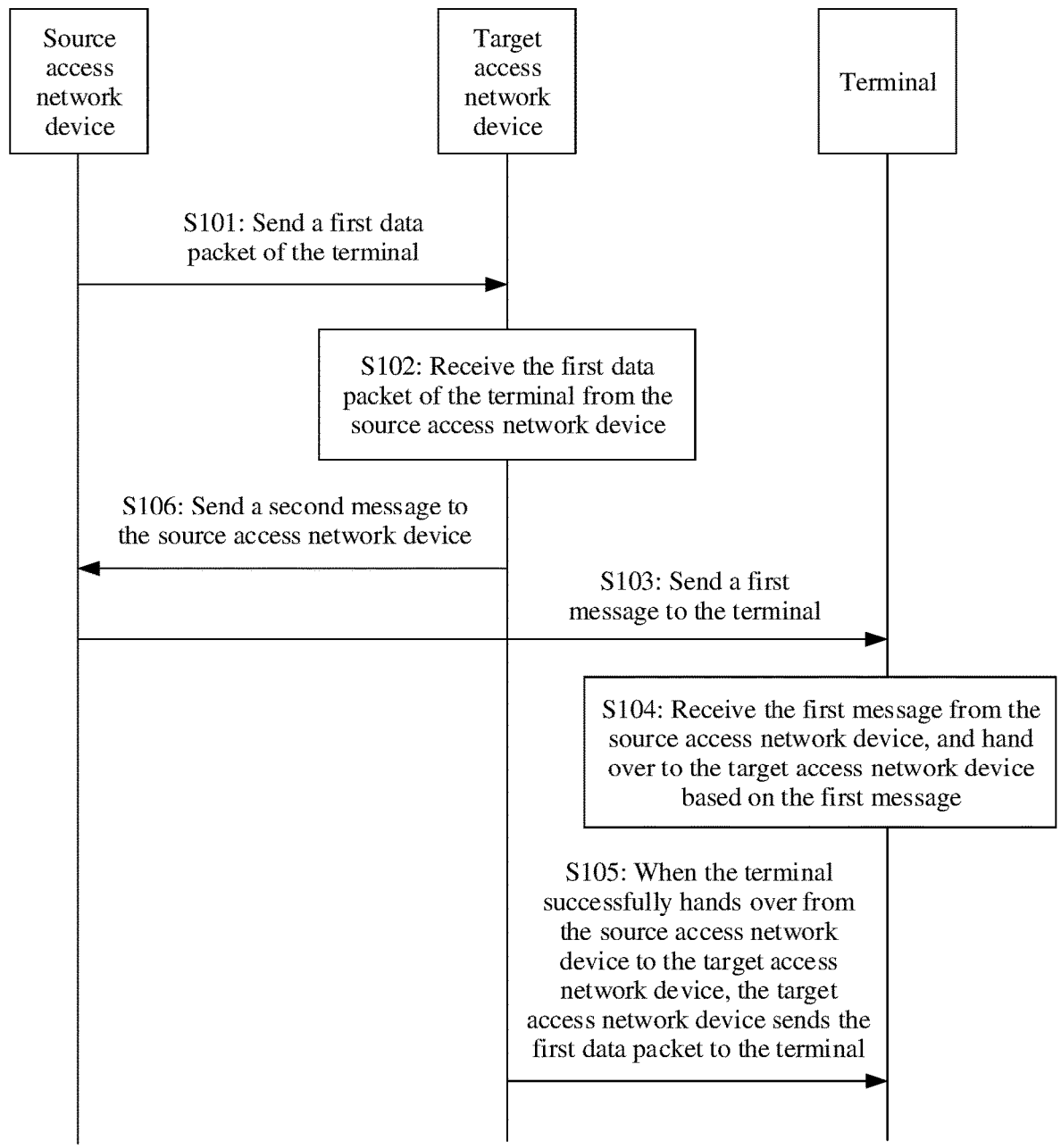
FIG. 13 is a second schematic flowchart of a communication method according to an embodiment of this application.

Optionally, in another implementation scenario of the foregoing embodiment, to improve accuracy of determining, by the source access network device, that the target access network device has received the first data packet, the source access network device may determine, in the following manner, that the target access network device has received the first data packet. As shown in FIG. 13, the method may further include the following steps.

S106: The target access network device sends the second message to the source access network device, where the second message is used to indicate that the target access network device has received the first data packet.

Correspondingly, the source access network device may receive the second message from the target access network device, and then perform step S103 in which the source access network device sends the first message to the terminal.

The second message may be a data reception confirmation indication (for example, a User Data received indication).

Correspondingly, in this embodiment of this application, S103 in which the source access network device determines that the target access network device has received the first data packet may be specifically implemented in the following manner: The source access network device may determine, based on the second message, that the target access network device has received the first data packet. It is clear that in this case, S103 may be replaced with the following: When the source access network device receives the second message from the target access network device, the source access network device sends the first message to the terminal.

In another possible implementation, in this embodiment of this application, the source access network device may alternatively determine, in the following manner 3, that the target access network device has received the data packet.

Manner 3: The source access network device determines, based on latency information, that the target access network device has received the first data packet. It is clear that in this case, step S103 may be replaced with the following: When the source access network device determines, based on the latency information, that the target access network device has received the first data packet, the source access network device sends the first message to the terminal.

For example, when sending the first data packet to the target access network device, the source access network device may start a timer. If the timer expires, the source access network device determines that the target access network device has received the first data packet.

A manner of obtaining the latency information is not limited in this embodiment of this application.

For example, on the one hand, the latency information may be preconfigured for the terminal, or the source access network device may determine the latency information based on QoS information of the first data packet, or the source access network device obtains the latency information from a session management function unit in a session management process.

For example, the source access network device may determine a transmission latency of the core network based on 5G QoS identifier (5QI) information in a QoS parameter, to determine the latency information.

For example, the session management process may be a PDU session establishment procedure or a PDU session update procedure (which may also be referred to as a PDU session modification procedure).

In an optional implementation, the source access network device may send the data packet of the terminal to the target access network device when determining to hand over the terminal to the target access network device, that is, the source access network device may send the data packet of the terminal to the target access network device in a process of sending a handover request message to the target access network device. In this case, if the target access network device allows the handover of the terminal to the target access network device, a latency can be reduced.

It should be understood that, for content of the handover request message, refer to descriptions in a current technology.

Figure 14:
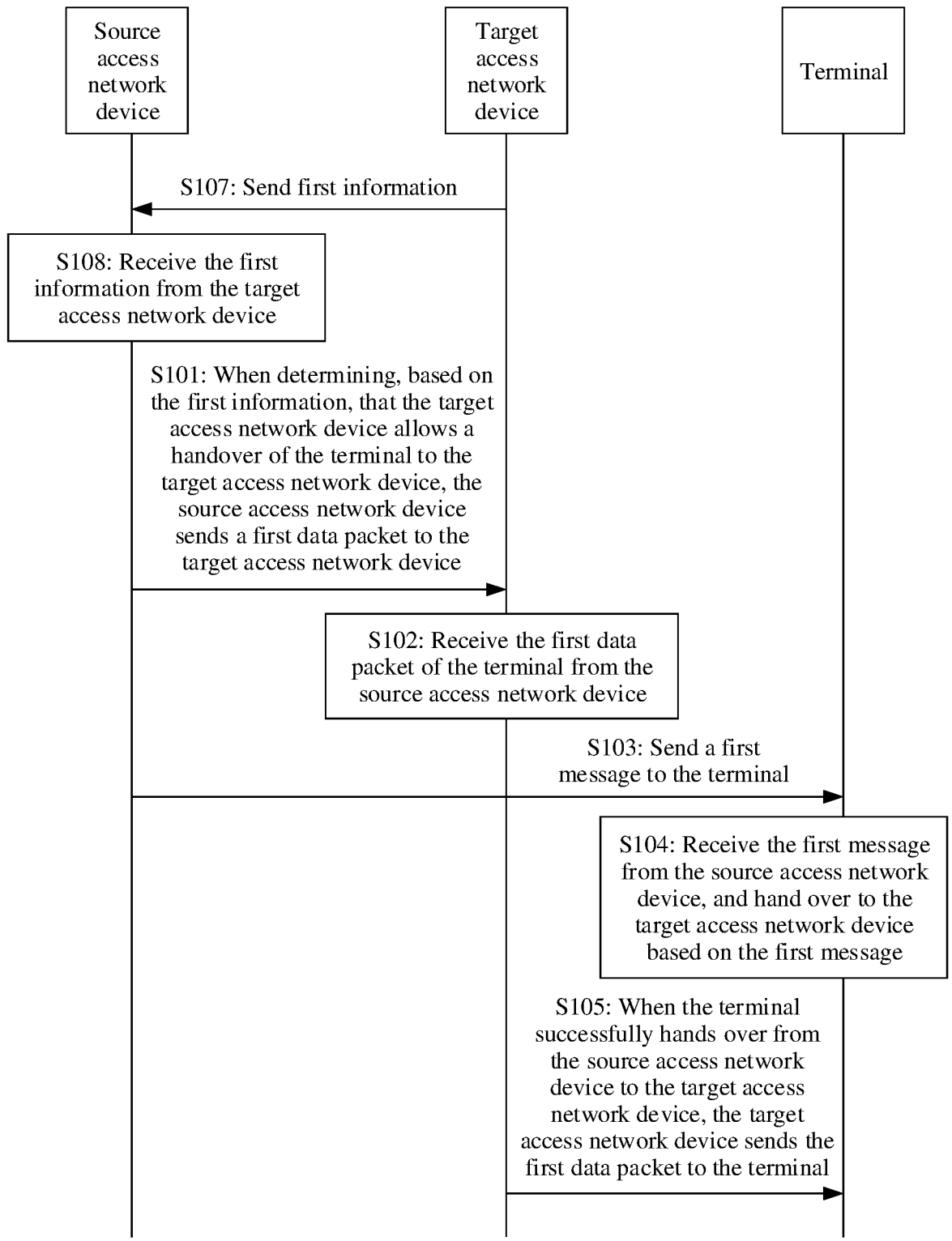
FIG. 14 is a third schematic flowchart of a communication method according to an embodiment of this application.

In another optional implementation, when the source access network device determines that the target access network device allows the handover of the terminal to the target access network device, the source access network device sends the data packet of the terminal to the target access network device. In this way, it is convenient to send the data packet of the terminal to the target access network device only when the target access network device allows the handover. This avoids a waste of resources caused when the target access network device rejects the handover. As shown in FIG. 14, before S101, the method may further include the following steps.

S107: The target access network device sends first information to the source access network device, where the first information is used to indicate that the handover of the terminal to the target access network device is allowed.

The first information may be carried in a handover request acknowledgment message, or the first information is a handover request acknowledgment message.

S108: The source access network device receives the first information from the target access network device.

For example, after the source access network device sends the handover request message to the target access network device, the source access network device receives, from the target access network device, the first information used to indicate that the handover is allowed, and the source access network device sends the first data packet to the target access network device.

To further determine that the target access network device allows the handover of the terminal to the target access network device, S101 may alternatively be replaced with the following step: The source access network device determines, based on the first information, that the target access network device allows the handover of the terminal to the target access network device, and the source access network device sends the first data packet to the target access network device.

In an optional implementation, before S101, the following process is further included: The source access network device obtains a measurement report and radio resource management information. If the source access network device determines, based on the measurement report and the radio resource management information, that a condition under which the terminal hands over between the access network devices is satisfied, the source access network device enables the data packet replication function, that is, the source access network device activates the data packet replication function of the source access network device. It may also be understood that the source access network device performs the foregoing data packet replication step.

For example, the measurement report may be reported by the terminal to the source access network device.

For example, the source access network device determines, based on the measurement report, that signal quality or a level of the source access network device is lower than a preset threshold, to determine that the condition under which the terminal hands over between the access network devices is satisfied.

In addition, after the source access network device determines the target access network device, the source access network device may send the handover request message to the target access network device, where the handover request message is used to request to hand over the terminal to the target access network device. If the target access network device allows the handover of the terminal to the target access network device, the target access network device sends, to the source access network device, a message (namely, the first information) indicating that the handover is agreed to. In this way, the source access network device may determine that the target access network device allows the handover of the terminal to the target access network device.

For example, the handover request message may include a cell radio network temporary identifier (C-RNTI), a target cell identifier, a physical layer identifier of a source cell, and a key parameter of the source access network device. Specifically, for other content further carried in the handover request message, refer to a handover request message in a process in which a source access network device requests to hand over a terminal to a target access network device in a current technology.

It should be understood that, if there is the Xn interface or the X2 interface between the source access network device and the target access network device, the source access network device may send the handover request message to the target access network device through the Xn interface or the X2 interface. Alternatively, the target access network device may send, to the source access network device through the X2 interface or the Xn interface, the message used to indicate that the handover is agreed to. For example, in FIG. 1, the source access network device and the target access network device may exchange, through the X2 interface, the handover request message and the message indicating that the handover is agreed to. In FIG. 4, the source access network device and the target access network device may exchange, through the Xn interface, the handover request message and the message indicating that the handover is agreed to.

If the Xn interface or the X2 interface exists between the source access network device and the target access network device, the source access network device may send the handover request message to a mobility management network element 1 corresponding to the source access network device, and then send, through the mobility management network element 1, the handover request message to a mobility management network element 2 corresponding to the target access network device. Then, the mobility management network element 2 sends the handover request message to the target access network device. When the target access network device agrees to the handover, the target access network device sends, to the source access network device through the mobility management network element 2 and the mobility management network element 1, the message indicating that the handover is agreed to. It should be understood that the mobility management network element (for example, an AMF network element or an MME) 1 and the mobility management network element 2 may be a same mobility management network element.

For example, in the system shown in FIG. 1, that the source access network device is the LTE eNB 1 and the target access network device is the LTE eNB 2 is used as an example. If there is no X2 interface between the LTE eNB 1 and the LTE eNB 2, the LTE eNB 1 sends the handover request message to the EPC, and then the EPC sends the handover request message to the LTE eNB 2 through the S1 interface. On the contrary, when the LTE eNB 2 agrees to the handover, the LTE eNB 2 sends, to the EPC through the S1 interface, the message used to indicate that the handover is agreed to, and the EPC sends, to the LTE eNB 1 through the S1 interface, the message used to indicate that the handover is agreed to.

For example, in the system shown in FIG. 4, that the source access network device is the gNB 1 and the target access network device is the gNB 2 is used as an example. If there is no Xn interface between the gNB 1 and the gNB 2, the gNB 1 sends the handover request message to the NG-Core network through the N2 interface, and then the NG-Core network sends the handover request message to the gNB 2 through the N2 interface. On the contrary, when the gNB 2 agrees to the handover, the gNB 2 sends, to the NG-Core network through the N2 interface, the message used to indicate that the handover is agreed to, and the NG-Core network sends, to the gNB 1 through the N2 interface, the message used to indicate that the handover is agreed to.

If the source access network device and the target access network device belong to different networks, and there is no interface between the source access network device and the target access network device, for example, the source access network device is an eNB, and the target access network device is a gNB, the eNB sends the handover request message to an EPC through an S1 interface, then the EPC sends the handover request message to an NG-Core network through an interface between the EPC and the NG-Core network, and the NG-Core network sends the handover request message to the gNB through an N2 interface. On the contrary, when the gNB agrees to the handover, the gNB sends, to the NG-Core network through the N2 interface, the message used to indicate that the handover is agreed to, and the NG-Core network sends, to the EPC through the interface, the message used to indicate that the handover is agreed to. The EPC sends, to the LTE eNB through the S1 interface, the message indicating that the handover is agreed to.

It should be understood that, in this embodiment of this application, for the interface for sending the data packet by the source access network device to the target access network device, refer to the interface for sending the handover request message by the source access network device to the target access network device.

Figure 15:
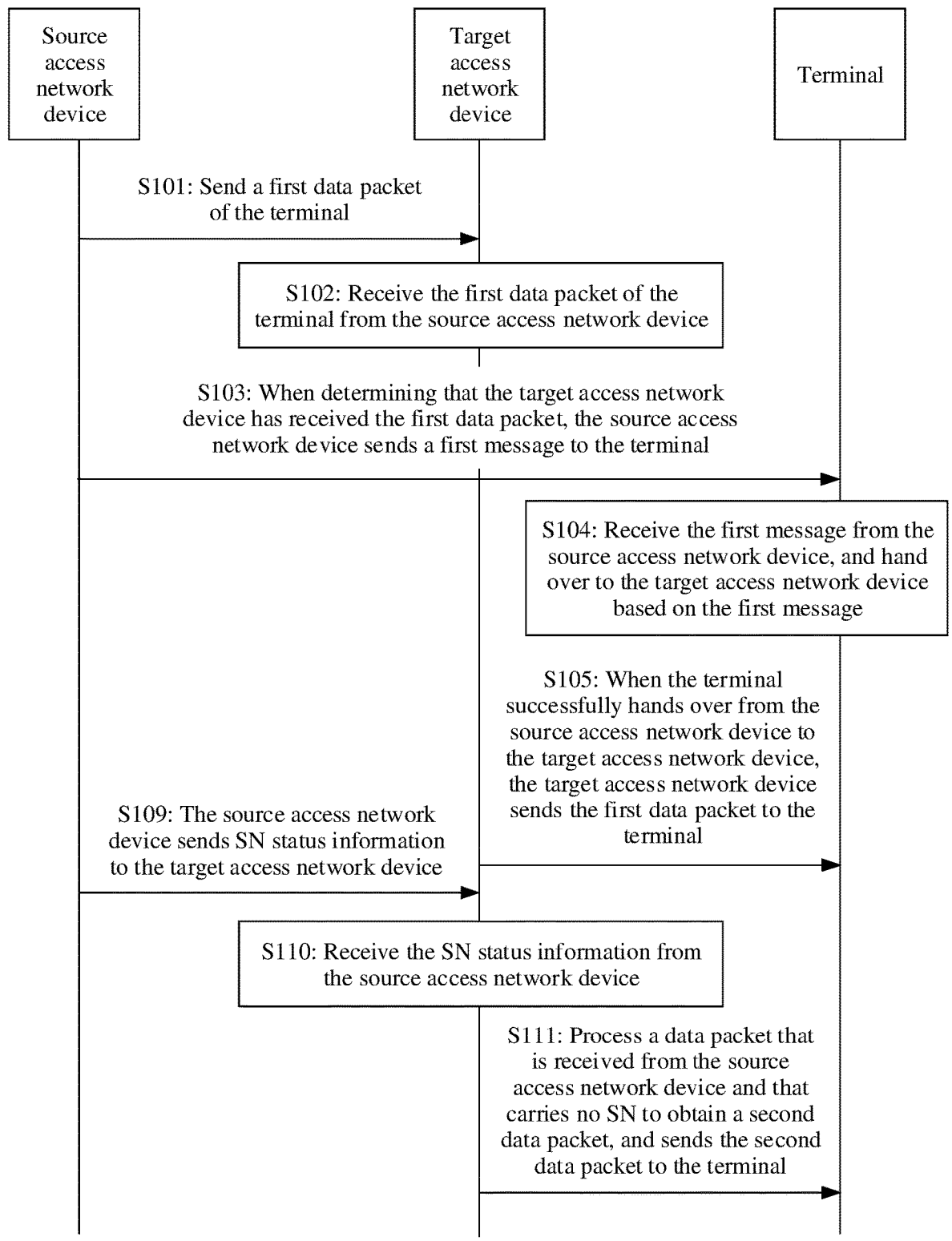
FIG. 15 is a fourth schematic flowchart of a communication method according to an embodiment of this application.

Optionally, in another implementation scenario of the foregoing embodiment, in the process in which the source access network device sends the data packet of the terminal to the target access network device, the source access network device may further send sequence number SN status information to the target access network device. As shown in FIG. 15, the method may further include the following steps.

S109: The source access network device sends the sequence number SN status information to the target access network device.

The SN status information is used by the target access network device to send the data packet to the terminal. The SN status information may specifically include a downlink PDCP SN sending status. For example, the downlink PDCP SN sending status is used to indicate a next new PDCP SN that needs to be allocated by the target access network device.

For example, the SN status information may be sent to the target access network device in the process in which the source access network device requests the handover from the target access network device. For example, the SN status information may be carried in the handover request message. In this way, after receiving the first data packet, the target access network device may set an SN of the data packet based on the SN status information.

It should be understood that, in this embodiment of this application, the source access network device may send the SN status information to the target access network device in the following cases: In one case, the SN status information is used to indicate an SN of a data packet sent by the source access network device to the terminal. In the other case, the SN status information is used to indicate an SN that needs to be carried in a data packet sent by the target access network device to the terminal.

S110: The target access network device receives the SN status information from the source access network device.

In addition to the data packet in which the SN is set, data packets of the terminal sent by the source access network device to the target access network device may further include a data packet that carries no SN. Therefore, if the target access network device receives, from the source access network device, the data packet that carries no SN, after S110, the method may further include S111.

S111: The target access network device processes, based on the SN status information, a data packet that is received from the source access network device and that carries no SN, to obtain a second data packet, and sends the second data packet to the terminal.

An SN of the second data packet may be determined based on the SN status information.

It should be understood that, on the one hand, the data packet that carries no SN may be a data packet, for example, an IP packet, an ethernet packet, or a data packet of another type, in the first data packet.

For example, the first data packet includes a data packet 1, a data packet 2, and a data packet 3. The source access network device has set SNs for the data packet 1 and the data packet 2, that is, the data packet 1 and the data packet 2 carry the SNs. However, the data packet 3 carries no SN. In this case, when receiving the data packet 3, the target access network device may determine the SN of the data packet 3 based on the SN status information.

On the other hand, the data packet that carries no SN may alternatively be a data packet in addition to the first data packet in the data packets of the terminal. For example, if the data packets of the terminal include the first data packet and the second data packet, the first data packet carries an SN, and the second data packet carries no SN, the SN of the second data packet is determined based on the SN status information.

It should be understood that, after S111, the method may further include: receiving, by the terminal, the second data packet from the target access network device.

Figure 16A:
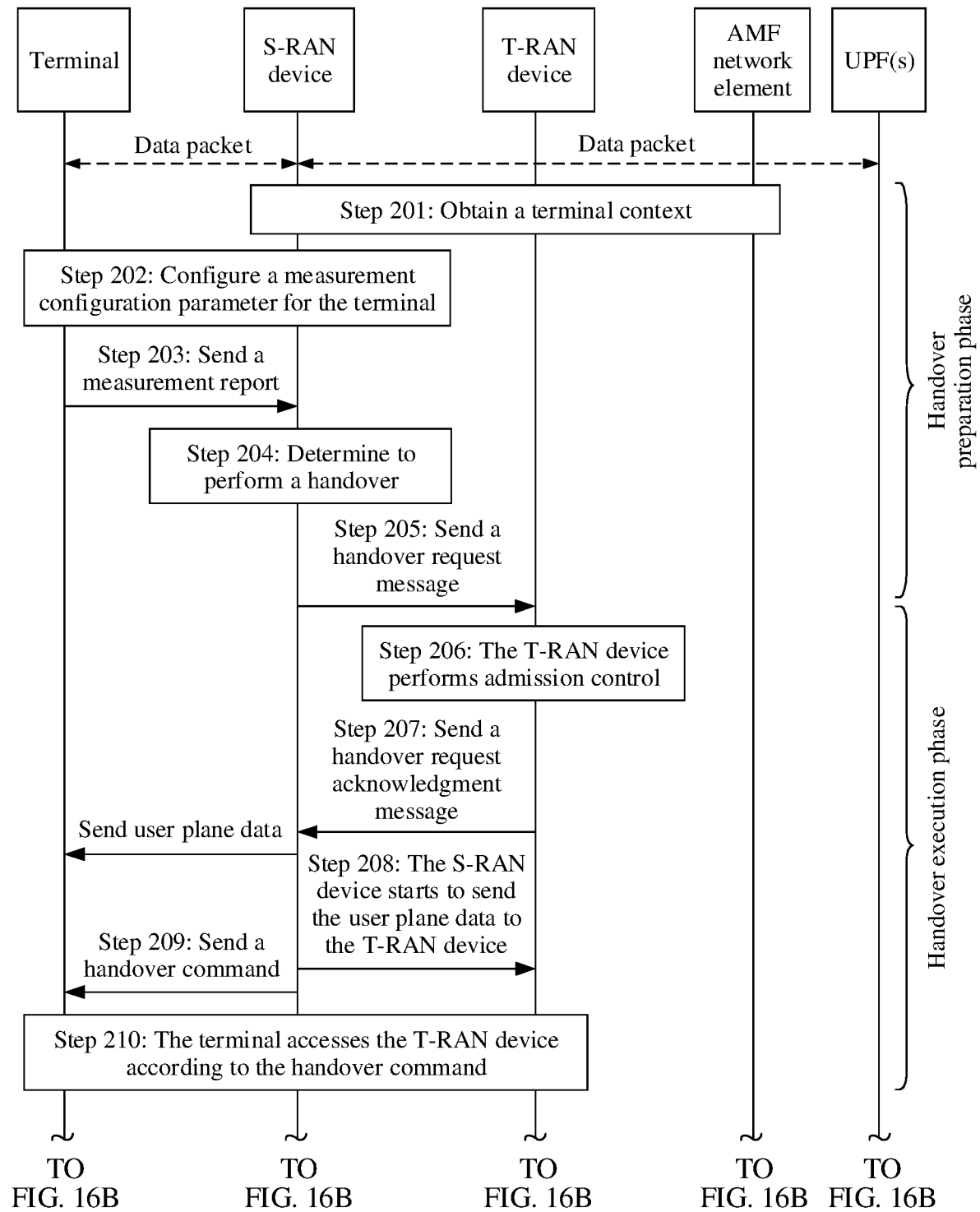
FIG. 16A and FIG. 16B are a schematic flowchart of a specific embodiment according to an embodiment of this application.
Figure 16B:
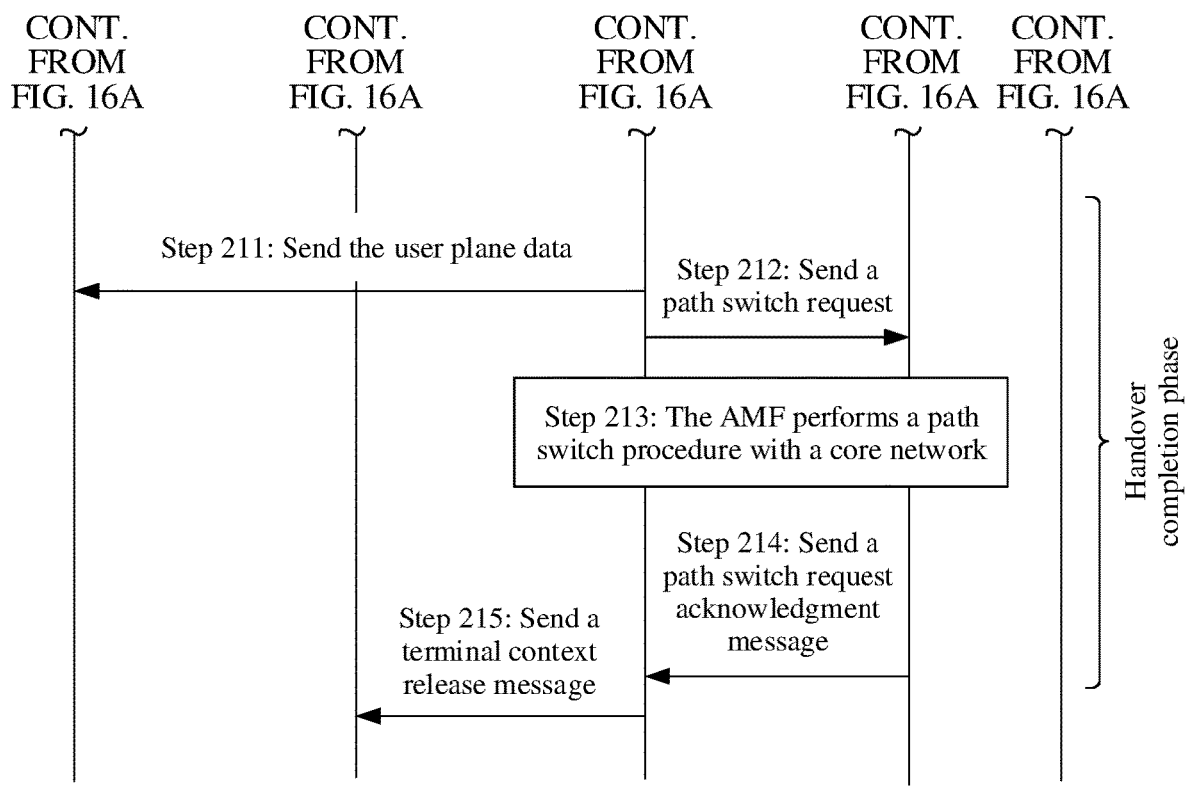
Figure 17A:
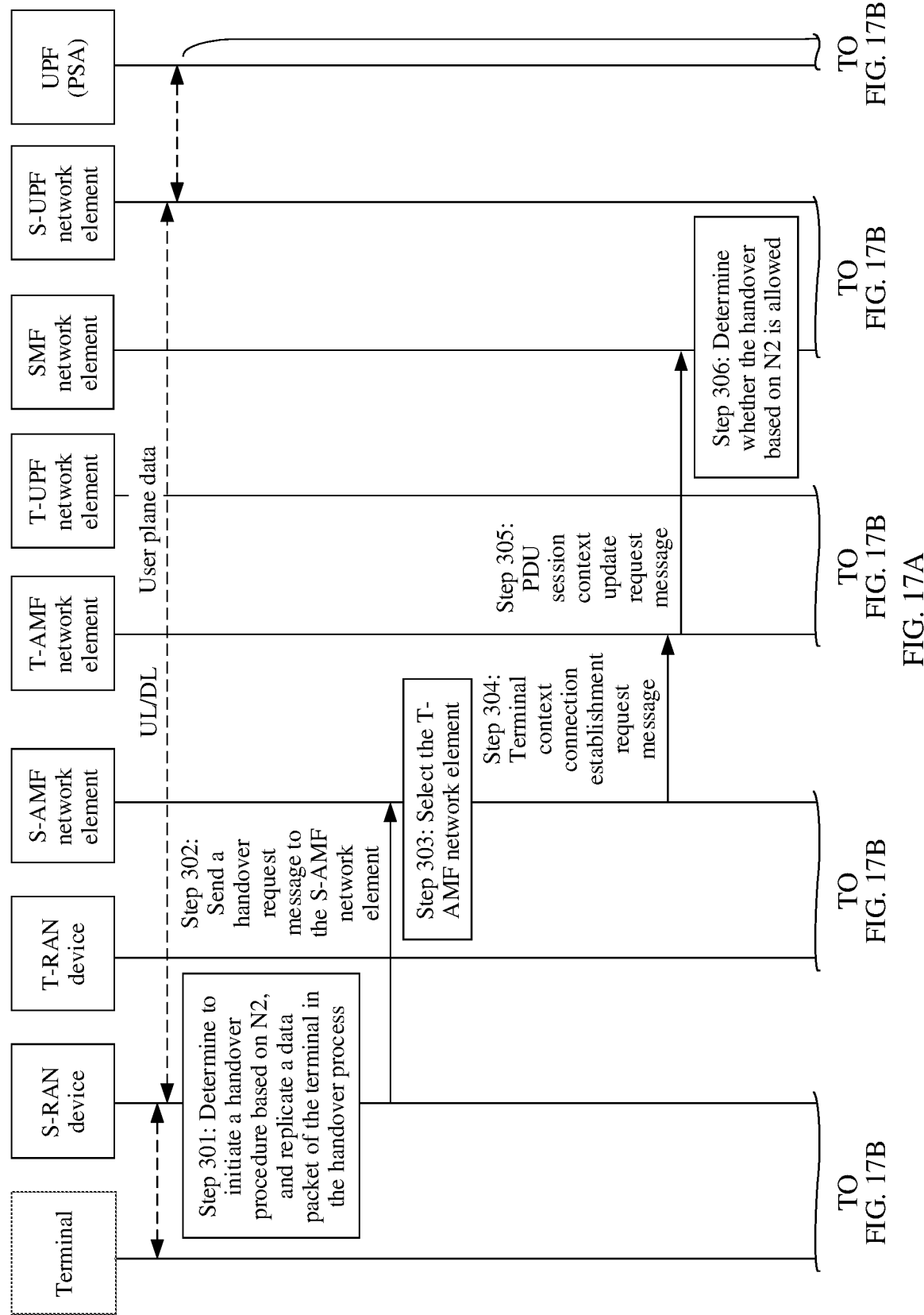
Figure 17B:
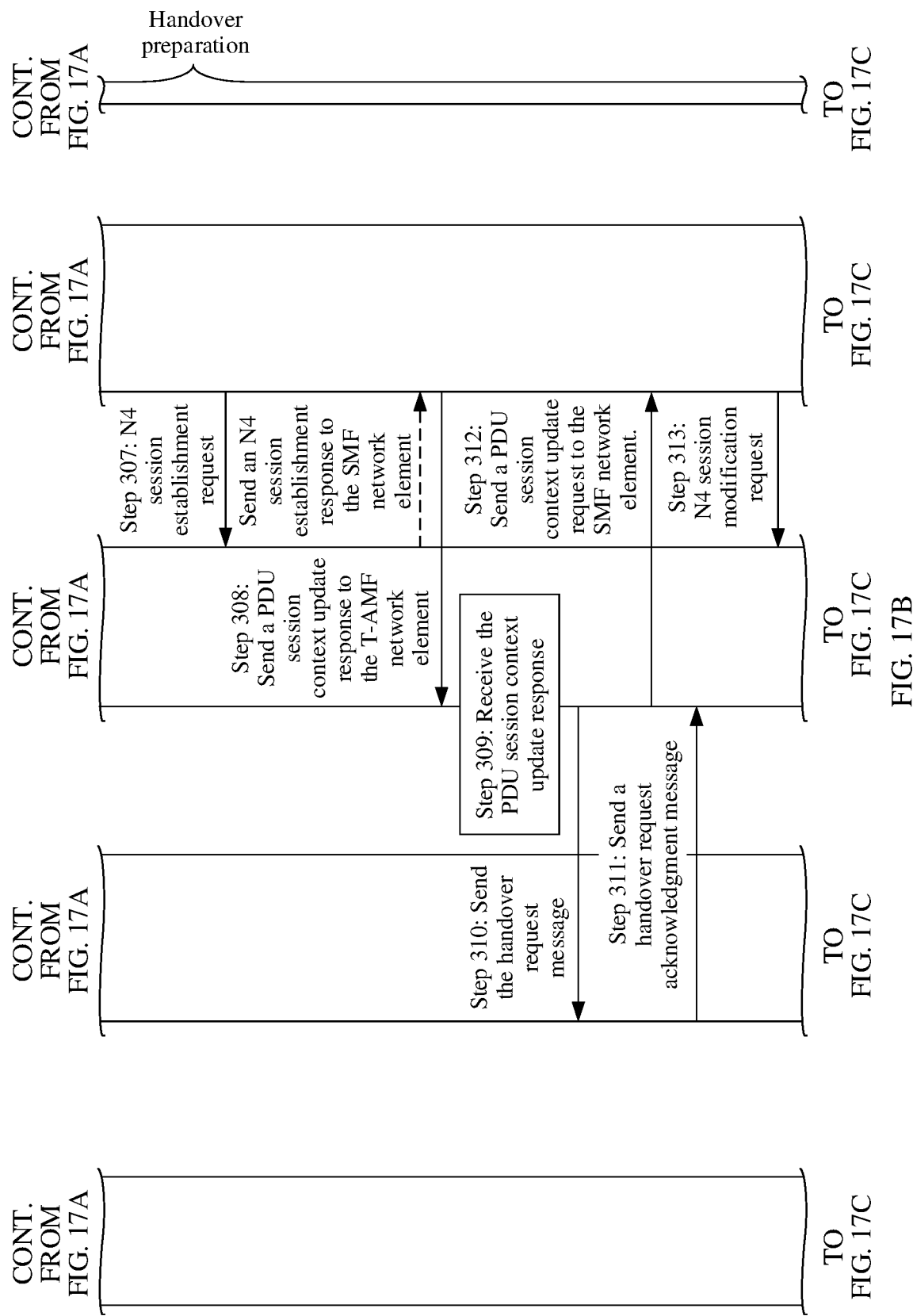

FIG. 16A and FIG. 16B show another communication method according to an embodiment of this application. For ease of description, the following uses an example in which a source access network device is an S-RAN device, a target access network device is a T-RAN device, and there is an Xn interface between the S-RAN device and the T-RAN device. Details are as follows:

Step 201: The S-RAN device obtains a terminal context from an AMF network element.

Specifically, the S-RAN device obtains mobility control information from the AMF network element.

The mobility control information may include the terminal context.

The terminal context may include roaming access restriction information.

The access restriction information may be provided in a connection establishment or tracking area (TA) update process, and the access restriction information may include available frequency band information.

It should be understood that before step 201, a terminal may establish a connection to a core network through the S-RAN device, and data may be transmitted between the terminal and the core network through the established connection. For example, the terminal sends an uplink data packet to the core network through the S-RAN device, or the terminal receives, through the S-RAN device, a downlink data packet sent by the core network.

Step 202: The S-RAN device configures a measurement configuration parameter for the terminal.

The S-RAN device may be a gNB, an NR, or another RAN device in 5G. This is not limited in this embodiment of this application.

Step 203: The terminal sends a measurement report to the S-RAN device based on the measurement configuration parameter.

The measurement report is used to indicate signal quality measured by the terminal, and may include measurement reports of one or more RAN devices.

For example, in a scenario in which the terminal accesses a first network through the S-RAN device, the S-RAN device is a RAN device to which a serving cell of the terminal belongs. The terminal periodically measures signal quality of the serving cell of the terminal and signal quality of a neighboring cell of the terminal. The terminal may periodically send a measurement report to the S-RAN device, and the measurement report includes signal quality of the RAN device to which the serving cell belongs and signal quality of a RAN device to which the neighboring cell of the terminal belongs. Alternatively, sending of the measurement report to the S-RAN device may be triggered by an event, or the measurement report may be sent to the S-RAN device after a TA to which the terminal belongs changes. The S-RAN device determines, based on the measurement report reported by the terminal, whether to hand over the terminal between the RAN devices.

The first network in this embodiment of this application is an EPC network or an NG-Core network.

The signal quality may include a reference signal received power (RSRP). Alternatively, the signal quality may include reference signal received quality (RSRQ). Alternatively, the signal quality may include an RSRP and RSRQ.

Certainly, any parameter that can be used to reflect the signal quality of the RAN device to which the serving cell of the terminal belongs and the signal quality of the RAN device to which the neighboring cell of the terminal belongs may be used as the signal quality of the RAN device to which the serving cell of the terminal belongs and the signal quality of the RAN device to which the neighboring cell of the terminal belongs. This is not limited in this embodiment of this application.

In an example, when the terminal determines that the signal quality of the serving cell is less than or equal to a first preset threshold or the signal quality of the neighboring cell is greater than or equal to a second preset threshold, the terminal sends the measurement report to the S-RAN device. In another example, the terminal sends obtained signal quality of the serving cell or obtained signal quality of the neighboring cell as a measurement report to the S-RAN device in a preset periodicity. In still another example, the terminal may receive a measurement indication sent by the S-RAN device, and the measurement indication is used to indicate the terminal to measure the signal quality of the serving cell or the signal quality of the neighboring cell. In this way, after receiving the measurement indication, the terminal may measure the signal quality of the serving cell or the signal quality of the neighboring cell based on the measurement configuration parameter. Further optionally, the measurement indication may further be used to indicate the terminal to periodically send a measurement report to the S-RAN device in a preset periodicity; and when the signal quality of the serving cell is less than or equal to the first preset threshold, or the signal quality of the neighboring cell is greater than or equal to the second preset threshold, the terminal sends a measurement report to the S-RAN device.

The first preset threshold, the second preset threshold, and the preset periodicity are not limited in this embodiment of this application, and may be set as required.

Step 204: The S-RAN device makes, based on the measurement report and radio resource management (RRM) information, a handover decision, and activates (or enables) a data packet replication function.

The data packet replication function may mean that the S-RAN device replicates a data packet that needs to be sent by the S-RAN device to the terminal in a handover procedure. In addition, activating the data packet replication function is an optional action, and may not be performed.

It should be understood that the following types of user plane data may exist in the S-RAN device: a data packet that is buffered in a buffer of the S-RAN device and that needs to be sent to the terminal, a data packet that is newly received from an air interface and that needs to be sent to the terminal, and a first data packet. The first data packet is a data packet that needs to be sent to the terminal in the handover procedure. In step 204, the S-RAN device only determines that the terminal needs to hand over between the RAN devices. However, in this case, the terminal does not access the T-RAN device. Therefore, in a time period from a time at which the S-RAN device determines that the terminal needs to hand over between the RAN devices to a time at which the S-RAN device sends a handover command to the terminal, the S-RAN device needs to send, to the terminal, the data packet to be sent to the terminal. Therefore, the time period from the time at which the S-RAN device determines that the terminal needs to hand over between the RAN devices to the time at which the S-RAN device sends the handover command to the terminal may be defined as the handover procedure, and the data packet that needs to be sent by the S-RAN device to the terminal in the handover procedure is defined as the first data packet.

Because communication quality of the air interface may become very poor after the S-RAN device determines to initiate the handover, reliability of a data packet received before the terminal hands over to the T-RAN device cannot be ensured. To ensure the reliability of the data packet received by the terminal in the handover procedure, the S-RAN device in this embodiment of this application may replicate the first data packet, to obtain a replicated data packet. It may be understood that the first data packet and the replicated data packet are a same data packet.

For example, when determining to initiate the handover, the S-RAN device needs to send a data packet 1 and a data packet 2 to the terminal. In this case, the S-RAN device may replicate the data packet 1 to obtain a data packet 1' and replicate the data packet 2 to obtain a data packet 2'. Then, the data packet 1 and the data packet 2 are sent to the terminal.

For example, the RRM information includes information about a RAN to which one or more neighboring cells belong. In this way, when determining, based on the measurement report, that the signal quality of the serving cell is not satisfied, the S-RAN device determines one RAN device, based on the radio resource management information, as the T-RAN device to which the terminal is to hand over. Specifically, the S-RAN device may select, based on signal quality of the one or more neighboring cells, a RAN device to which a neighboring cell whose signal quality is greater than or equal to the second preset threshold belongs as the T-RAN device to which the terminal is to hand over.

Step 205: The S-RAN device sends a handover request message to the T-RAN device.

The handover request message may be used to request to hand over the terminal to the T-RAN device.

The handover request message includes but is not limited to the following information: a handover cause, used to indicate a cause of the handover, for example, a radio network layer cause (a handover triggered due to a signal cause, resource-based optimization, and the like); a target cell ID, used to uniquely identify a target cell; a handover restriction list, including a serving PLMN, an equivalent PLMN, and a forbidden service area; a temporary identifier corresponding to the terminal, used by a CN device to search for a stored terminal context (UE context); an identifier of a core network control function entity associated with the terminal; a network slice identifier corresponding to each of one or more or all network slices selected by the terminal; information about a radio bearer that needs to be established and that corresponds to each of one or more or all network slices selected by the terminal, for example, a radio bearer identifier, a radio bearer-level QoS parameter, a tunnel termination point, and user plane security information corresponding to the radio bearer; information about a session that needs to be established and that corresponds to each of one or more or all network slices selected by the terminal, for example, a session identifier, a session-level QoS parameter, a tunnel termination point, and user plane security information corresponding to the session; information about a flow that needs to be established and that corresponds to each of one or more or all network slices selected by the terminal, for example, a flow identifier, a flow-level QoS parameter, a tunnel termination point, and user plane security information corresponding to the flow; radio bearer information, for example, a radio bearer identifier, a radio bearer-level QOS parameter, a tunnel termination point, and user plane security information corresponding to a radio bearer; information about another session that needs to be established, for example, a session identifier, a session-level QoS parameter, a tunnel termination point, and user plane security information corresponding to the session; information about another flow that needs to be established, for example, a flow identifier, a flow-level QoS parameter, a tunnel termination point, and user plane security information corresponding to the flow; and context information of the terminal, for example, a network slice identifier corresponding to one or more or all network slices that the terminal subscribes to.

For example, the UE context includes a mobility management context (MM Context), a bearer context, and network slice indication information. The MM context includes information such as a temporary identifier GUTI, a non-access stratum (NAS) key, and a security algorithm. The bearer context includes information such as a bearer identifier and QoS.

Optionally, the Handover Request message includes downlink SN status (DL SN Status) information.

Specifically, the S-RAN device sends the handover request (Handover Required) message to the T-RAN device through an interface (for example, the Xn interface) between the S-RAN device and the T-RAN device.

Step 206: The T-RAN device performs admission control.

That the T-RAN device performs admission control indicates that the T-RAN device has prepared a resource and is ready for the handover. In step 206, the T-RAN device performs admission control on the terminal based on a capability that is of the T-RAN device and that supports a flow/session/radio bearer of a network slice for communication between the terminal and the S-RAN device, a resource status, remapping policy information, and the like of the network slice for communication between the terminal and the S-RAN device.

For example, if the T-RAN device determines that information such as the capability that is of the T-RAN device and that supports the flow/session/radio bearer of the network slice for communication between the terminal and the S-RAN device, the resource status, and the remapping policy information of the network slice for communication between the terminal and the S-RAN device, the T-RAN device performs admission control. Otherwise, the T-RAN device sends, to the S-RAN device, information indicating that the handover of the terminal to the T-RAN device is rejected. For example, if the T-RAN device determines that a radio resource requirement required by the terminal can be satisfied, the T-RAN device performs admission control on the terminal.

In one case, the T-RAN device does not support at least one flow/session/radio bearer of at least one network slice for communication between the terminal and the S-RAN device, but has a capability of supporting a related network slice. In this case, the T-RAN device may request the CN to remap, to the network slice supported by the T-RAN device, the at least one flow/session/radio bearer of the at least one network slice for communication between the terminal and the S-RAN device. For example, the T-RAN device determines, by using the network slice indication information carried in the handover request message received in step 205, that the T-RAN device does not support the at least one network slice for communication between the terminal and the S-RAN device, but a QoS requirement of a flow/session/radio bearer of current communication of the terminal may be satisfied based on the radio bearer context received in step 205 and a current resource usage status. In this case, the T-RAN device considers that the T-RAN device has a capability of supporting a network slice required by the flow/session/radio bearer of the terminal.

In another possible case, the T-RAN device cannot determine whether the T-RAN device supports the network slice for communication between the terminal and the S-RAN device. In this case, when the T-RAN device does not support at least one network slice for communication between the terminal and the S-RAN device, the T-RAN device may request the CN to remap, to a network slice supported by the T-RAN device, at least one flow/session/radio bearer of the at least one network slice for communication between the terminal and the S-RAN device. For example, the T-RAN device cannot determine, by using the network slice indication information carried in the handover request message received in step 205, whether the T-RAN device supports the at least one network slice for communication between the terminal and the S-RAN device, but a QoS requirement of a flow/session/radio bearer of current communication of the terminal may be satisfied based on the radio bearer context received in step 205 and a current resource usage status. In this case, the T-RAN device considers that the T-RAN device has a capability of supporting a related network slice.

In another possible case, the T-RAN device does not support at least one flow/session/radio bearer of at least one network slice for communication between the terminal and the S-RAN device, but the T-RAN device may remap, based on the network slice remapping policy information received in step 205, the flow/session/radio bearer to a network slice supported by the T-RAN device. In this case, the T-RAN device may request the CN to remap, to the network slice supported and selected by the T-RAN device, the at least one flow/session/radio bearer of the at least one network slice for communication between the terminal and the S-RAN device.

Step 207: The T-RAN device sends a handover request acknowledgment message to the S-RAN device.

The handover request acknowledgment message may be used to indicate that the T-RAN device allows the handover of the terminal to the T-RAN device.

For example, the handover request acknowledgment message may be the first information in the foregoing embodiment.

Specifically, the T-RAN device may perform step 207 when performing admission control.

Step 208: When receiving the handover request acknowledgment message sent by the T-RAN device, the S-RAN device starts to send the user plane data to the T-RAN device.

The user plane data includes at least the replicated data packet, so that the T-RAN device can receive the user plane data of the terminal from the S-RAN device.

For example, the user plane data in step 208 may be the first data packet in the foregoing embodiment.

It should be understood that, the user plane data sent by the S-RAN device to the T-RAN device in step 208 further includes the data packet that is buffered in the buffer of the S-RAN device and needs to be sent to the terminal, or the newly received data packet that needs to be sent to the terminal.

For example, the data packet that is buffered in the buffer of the S-RAN device and that needs to be sent to the terminal is a data packet 21, the data packet that is newly received from the air interface and that needs to be sent to the terminal is a data packet 22, and data packets that need to be sent to the terminal in the handover procedure are the data packet 1 and the data packet 2. In this case, user plane data packets that may be sent by the S-RAN device to the T-RAN device in step 208 include the data packet 21, the data packet 22, the data packet 1', and the data packet 2'.

It should be understood that, when the S-RAN device receives the handover request acknowledgment message, the S-RAN device not only sends the user plane data to the terminal, but also sends the user plane data to the T-RAN device.

It should be understood that, in an optional implementation, when the T-RAN device receives the user plane data of the terminal, the T-RAN device sends a data reception confirmation indication to the S-RAN device, so that the S-RAN device receives the data reception confirmation indication from the T-RAN device, to determine that the T-RAN device has received the user plane data.

Step 209: When the S-RAN device determines that the T-RAN device has received the user plane data, the S-RAN device sends the handover command to the terminal.

The handover command is used to indicate the terminal to hand over to the T-RAN device. For example, the handover command may carry a target cell identifier or an identifier of a T-RAN device to which a target cell belongs.

For example, the handover command may be the first message in the foregoing embodiment.

Specifically, for a manner in which the S-RAN device determines that the T-RAN device has received the user plane data in step 209, refer to the foregoing embodiment. Details are not described herein again in this embodiment of this application.

Step 210: The terminal accesses the T-RAN device according to the handover command.

For a specific implementation of step 210, refer to descriptions in a current technology. Details are not described herein again.

Step 211: The T-RAN device sends the user plane data to the terminal.

The user plane data may include the replicated data packet.

It should be understood that, for the user plane data in step 211, refer to the first data packet in the foregoing embodiment. Details are not described again.

It should be understood that the data packet sent by the T-RAN device to the terminal in step 211 includes the replicated data packet, a processed data packet that is buffered in the buffer of the S-RAN device and that needs to be sent to the terminal, and a processed data packet that is newly received from the air interface and that needs to be sent to the terminal.

It should be understood that, after the terminal successfully hands over from the S-RAN device to the T-RAN device, the T-RAN device may send the user plane data to the terminal. In this case, if the terminal has an uplink data packet, the uplink data packet may also be sent to a UPF network element through the T-RAN device. In this case, a network side does not know that the terminal hands over to the T-RAN device. Therefore, to enable a downlink data packet sent by the network side to be sent to the terminal through the T-RAN device accessed by the terminal, the method provided in this embodiment of this application may further include the following steps.

Step 212: The T-RAN device sends a path switch request to the AMF network element.

Step 213: The AMF network element performs a path switch procedure with the core network.

For a specific path switch procedure between the AMF network element and the core network, refer to descriptions in a current technology. The path switch procedure is performed, so that the UPF network element may determine to send a downlink data packet of the terminal to the T-RAN device.

Step 214: The AMF network element sends a path switch request acknowledgment message to the T-RAN device.

It may be understood that after step 212 to step 414, the AMF network element may determine that a RAN device serving the terminal is the T-RAN device. In other words, the AMF network element may subsequently communicate with the terminal through the T-RAN device.

Step 215: After receiving the path switch request acknowledgment message, the T-RAN device sends a terminal context release (UE context release) message to the S-RAN device.

It should be understood that, after receiving the terminal context release message, the S-RAN device releases the terminal context.

In this embodiment of this application, before the terminal hands over to the T-RAN device, the S-RAN device sends the user plane data of the terminal to the T-RAN device, and then in the handover procedure, the S-RAN device still sends, to the terminal, the user plane data of the terminal that needs to be sent to the terminal. After the terminal successfully hands over from the S-RAN device to the T-RAN device, the T-RAN device sends the user plane data of the terminal to the terminal. That is, in the handover procedure, the terminal may separately obtain two pieces of the same user plane data of the terminal from the S-RAN device and the T-RAN device, thereby ensuring data packet transmission reliability in the handover procedure. In addition, before the terminal hands over to the T-RAN device, the S-RAN device sends the user plane data of the terminal to the T-RAN device, so that a transmission latency of the handover can be reduced.

In FIG. 16A and FIG. 16B, that the T-RAN device and the S-RAN device belong to the same AMF network element is used as an example. In an actual process, the S-RAN device and the T-RAN device may belong to different AMF network elements.

In conclusion, FIG. 16A and FIG. 16B include a handover preparation phase (for example, step 201 to step 207), a handover execution phase (for example, step 208 to step 211), and a handover completion phase (for example, step 212 to step 215).

FIG. 17A, FIG. 17B, FIG. 17C, and FIG. 17D show a communication method according to an embodiment of this application. For ease of description, in the following descriptions, an example in which a source access network device is an S-RAN device, a target access network device is a T-RAN device, there is no Xn interface between the S-RAN device and the T-RAN device, and the S-RAN device initiates a handover procedure (which may be referred to as a handover procedure based on N2) to an S-AMF is used. The handover procedure based on N2 mainly includes a handover preparation phase and a handover execution phase. The handover procedure based on N2 includes a scenario in which an AMF network element of the S-RAN device is the same as that of the T-RAN device, and a scenario in which an AMF network element of the S-RAN device is different from that of the T-RAN device. In the following descriptions, an example of the scenario in which an AMF network element of the S-RAN device is different from that of the T-RAN device (for example, the S-RAN device corresponds to an S-AMF network element, and the T-RAN device corresponds to a T-AMF network element) in FIG. 17A, FIG. 17B, FIG. 17C, and FIG. 17D is used. Details are as follows.

Step 301: The S-RAN device determines to initiate a handover procedure based on N2, and replicates a data packet of a terminal in the handover procedure.

It should be understood that before step 301, the terminal establishes a connection (for example, a PDU session) to a source user plane (S-UPF) network element through the S-RAN device. The terminal may send uplink (UL) user plane data to the S-UPF network element through the S-RAN device. The S-UPF network element may send downlink (DL) user plane data to the terminal through the S-RAN device.

For a process in which the S-RAN device replicates the data packet that needs to be sent by the S-RAN device to the terminal in the handover procedure in step 301, refer to step 204. Details are not described herein again.

Step 302: The S-RAN device sends a handover request message to the S-AMF network element.

The handover request message may include an identifier of the T-RAN device, a source to target container (source to target transparent container), a session management (SM) N2 information list, a PDU session identifier, and an intra-system handover indication.

The SM N2 information list includes an indication indicating whether a direct forwarding path is available. The intra-system handover indication is used to indicate that the handover is an intra-5G handover.

For example, the direct forwarding path may be a path between the S-RAN device and the T-RAN device, namely, a network element passed through from the S-RAN device to the T-RAN device.

The source to target container includes RAN information used by the T-RAN device. A core network does not perceive the information carried in the source to target container, that is, the source to target container is transparently transmitted for a core network node.

It should be noted that the source to target container is a container sent by the S-RAN device to the T-RAN device. Specific content in the container is not identified or processed by an intermediate network element, and may be directly transmitted to the T-RAN device. After receiving the source to target container, the T-RAN device may parse the content in the source to target container.

Optionally, the source to target container includes SN status information, and the T-RAN device may set an SN of the data packet based on the SN status information.

The S-AMF network element is an AMF network element connected to the S-RAN device.

Step 303: If the S-AMF network element cannot serve the terminal, the S-AMF network element selects a T-AMF network element for the terminal.

For example, the S-AMF network element selects, based on the identifier of the T-RAN device, an AMF network element connected to the T-RAN device as the T-AMF network element.

For example, the identifier of the T-RAN device is used to identify the T-RAN device.

For example, if the S-AMF network element determines, based on the identifier of the T-RAN device, that the T-RAN device is not managed by the S-AMF network element, the S-AMF network element determines that the S-AMF network element cannot serve the terminal.

Step 304: The S-AMF network element sends a terminal context connection establishment request (Namf_Communication_CreatUEContext Request) message to the T-AMF network element.

For example, the Namf_Communication_CreatUEContext Request message includes N2 information and terminal context information.

The N2 information includes one or more of the identifier of the T-RAN device, the source to target container including an SN status, the SM N2 information list, the PDU session identifier, and a service area restriction.

For example, one PDU session corresponds to one SM N2 information list, and the SM N2 information list is sent to an SMF network element.

For example, the terminal context includes a subscription permanent identifier (SUPI), an allowed network slice selection assistance information (NSSAI) corresponding to an access type, the PDU session identifier, information about the SMF network element corresponding to the terminal, single network slice selection assistance information (S-NSSAI), a PCF network element identifier, and a data network name (DNN).

Step 305: The T-AMF network element sends a PDU session context update request (Nsmf_PDUSession_UpdateSMContext Request) message to the SMF network element.

The Nsmf_PDUSession_UpdateSMContext Request message may include the SM N2 information list.

For example, a PDU session context includes an IP address, an access point name (APN), addresses of an SMF network element and a UPF network element, and context information of each QoS flow used for a PDU session.

Before step 305, the method may further include: determining, by the T-AMF network element, the SMF network element in step S305 based on the information about the SMF network element in the terminal context.

Step 306: The SMF network element determines, based on the identifier of the T-RAN device, whether the handover based on N2 is allowed.

For example, if the SMF network element determines that a session service of the terminal cannot be transmitted in a target cell that is of the T-RAN device and that is indicated by the identifier of the T-RAN device, the handover based on N2 is not allowed. For example, some services can be accessed only in a specific area, such as a campus network. The service cannot be accessed outside a campus.

Further, the SMF network element may detect whether the UPF network element can serve the terminal. For example, if the SMF network element determines that the terminal moves out of a service area of the S-UPF network element, the SMF network element selects a T-UPF network element for the terminal. If the SMF network element selects a T-UPF network element, step 307 is performed.

Step 307: The SMF network element sends an N4 session establishment request (Session establish request) to the T-UPF network element, so that the T-UPF network element can receive the N4 session establishment request.

The N4 session establishment request may be used to establish a user plane connection, and the N4 session establishment request may carry user plane tunnel information.

It should be understood that the T-UPF network element may further send an N4 session establishment response to the SMF network element.

Step 308: The SMF network element sends a PDU session context update response (Nsmf_PDUSession_UpdateSMContext Response) message to the T-AMF network element.

For example, if the SMF network element accepts a PDU session handover, the Nsmf_PDUSession_UpdateSMContext Response message includes an N3 IP address, an uplink (UL) CN tunnel identifier, and a QoS parameter. If the SMF network element does not accept the PDU session handover, the Nsmf_PDUSession_UpdateSMContext Response message includes a cause value indicating that the PDU session handover is not accepted.

Step 309: The T-AMF network element receives the Nsmf_PDUSession_UpdateSMContext Response message from the SMF network element.

For example, if the T-AMF network element determines to perform the handover procedure based on N2, step 310 is performed.

For example, when the T-AMF network element receives the Nsmf_PDUSession_UpdateSMContext Response message sent by the SMF network element, if the Nsmf_PDUSession_UpdateSMContext Response message indicates that the PDU session handover is accepted, the T-AMF network element determines to perform the handover procedure based on N2. Alternatively, the T-AMF network element determines that a maximum waiting time expires, and the T-AMF network element determines to perform the handover procedure based on N2.

Step 310: The T-AMF network element sends the handover request message to the T-RAN device.

The handover request message may include at least one of N2 MM information, an N2 session management (SM) information list, a source to target container, a service area restriction, or a list of rejected PDU sessions. The source to target container includes the SN status information.

For example, the N2 MM information includes a security context.

For example, the list of rejected PDU sessions carries an identifier of a PDU session whose handover fails.

Step 311: The T-RAN device sends a handover request acknowledgment message to the T-AMF network element.

The handover request acknowledgment message may include at least one of a target to source container, an N2 SM response list, a list of failed PDU sessions, or a T-RAN SM N3 transmission information list.

For example, the target to source container carries information about a QoS flow whose handover is successful.

For example, the handover request acknowledgment message in step 311 may be the first information in the foregoing embodiment.

The target to source container is a container sent by the T-RAN device to the S-RAN device. Specific content in the container is not identified or processed by an intermediate network element, and may be directly transmitted to the S-RAN device. After receiving the target to source container, the S-RAN device may parse the content in the target to source container.

For example, the target to source container may include a security context, QoS information, and a target cell identifier.

Step 312: The T-AMF network element sends an Nsmf_PDUSession_UpdateSMContext Request message to the SMF network element, so that the SMF network element receives the Nsmf_PDUSession_UpdateSMContext Request message from the T-AMF network element.

The Nsmf_PDUSession_UpdateSMContext Request message includes a PDU session identifier, an N2 SM response, and a T-RAN SM N3 forwarding information list.

For each N2 SM response, the T-AMF network element sends the N2 SM response to the SMF network element. If there is no T-UPF network element, the SMF network element stores N3 tunnel information.

For example, the N3 tunnel information includes a tunnel identifier and a tunnel address.

It should be understood that if the SMF network element selects the T-UPF network element when performing step 306, the SMF network element performs step 313.

Step 313: The SMF network element sends an N4 session modification request (N4 session modify Request) to the T-UPF network element, where the N4 session modification request includes the T-RAN SM N3 forwarding information list, and an indication for optionally allocating a DL forwarding tunnel.

For example, the T-RAN SM N3 forwarding information list includes an N3 address and an N3 tunnel identifier.

Step 314: The UPF network element sends an N4 session modification response (N4 session modify Response) message to the SMF network element.

The N4 session modification response message may include an SM N3 forwarding information list.

Step 315: The SMF network element sends an N4 session modification request to the S-UPF network element.

The N4 session modification request may include the T-RAN SM N3 forwarding information list or a T-UPF SM N3 forwarding information list, and an indication indicating a DL forwarding tunnel for indirect forwarding.

Step 316: The S-UPF network element sends an N4 session modification response to the SMF network element, where the N4 session modification response includes an S-UPF SM N3 forwarding information list.

Step 317: The SMF network element sends an Nsmf_PDUSession_UpdateSMContext Response including an N2 SM information list to the T-AMF network element.

Step 318: The T-AMF network element sends an Namf_Communication_CreateUEContext Response to the S-AMF network element.

The response may include at least one of the N2 information, a PDU session establishment failure list, or the N2 SM information list.

Step 319: The S-AMF network element sends a handover command to the S-RAN device.

The handover command includes the target to source container and/or N2 SM information.

Optionally, the handover command may further include the list of failed PDU sessions.

Step 320: When receiving the handover request acknowledgment message sent by the T-RAN device, the S-RAN device starts to send the data packet of the terminal to the T-RAN device.

The data packet of the terminal may include a replicated data packet.

For example, the handover request acknowledgment message may be the first information in the foregoing embodiment.

Optionally, the T-RAN device may further send a data reception confirmation indication (for example, the second message in the foregoing embodiment) to the S-RAN device.

Step 321: When the S-RAN device determines that the T-RAN device has received the data packet of the terminal, the S-RAN device sends the handover command to the terminal.

The handover command may include a container of the terminal.

For example, the handover command in step 321 is the first message in the foregoing embodiment.

For example, the container of the terminal includes the target cell identifier.

Step 322: The terminal synchronizes to a target cell according to the handover command.

Step 323: The T-RAN device sends a handover acknowledgment message to the terminal.

The handover acknowledgment message may be used to indicate that the handover succeeds.

It should be understood that, after step 323, the T-RAN device may send, to the terminal, the data packet that is of the terminal and that is obtained from the S-RAN device.

Step 324: The T-RAN device sends a handover notification to the T-AMF network element.

The handover notification may be used to indicate that the handover succeeds.

Step 325: The T-AMF network element sends an N2 communication information notification (Namf_Communication_N2InfoNotify) to the S-AMF network element.

Step 326: The S-AMF network element sends the Namf_Communication_N2InfoNotify to the T-AMF network element.

Step 327: The S-AMF network element sends a PDU session context release (Nsmf_PDUSession_ReleaseSMContext) request to the SMF network element.

The Nsmf_PDUSession_ReleaseSMContext request may include the SUPI and the PDU session identifier.

Step 328: The T-AMF network element sends an Nsmf_PDUSession_UpdateSMContext request to the SMF network element.

The Nsmf_PDUSession_UpdateSMContext request may include a handover complete indication.

If the SMF network element selects the T-UPF network element, the method provided in this embodiment of this application may further include the following steps.

Step 329: The SMF network element sends an N4 session modification request to the T-UPF network element.

Step 330: The T-UPF network element sends an N4 session modification response to the SMF network element.

If the SMF network element does not select the T-UPF network element, the method provided in this embodiment of this application may further include the following steps.

Step 331: The SMF network element sends an N4 session modification request to the S-UPF network element.

Step 332: The S-UPF network element sends an N4 session modification response to the SMF network element.

Step 333: The SMF network element sends an N4 session modification request to a UPF (PSA) network element.

Step 334: The S-UPF network element sends an N4 session modification response to the SMF network element.

In this case, downlink user plane data sent by a network side to the terminal is sent to the T-UPF network element through the UPF (PSA), then is sent by the T-UPF network element to the T-RAN device, and then is sent by the T-RAN device to the terminal.

Finally, the SMF network element sends an Nsmf_PDUSession_UpdateSMContext response including the PDU session identifier to the T-AMF network element. The terminal initiates a mobility registration update procedure. The SMF network element sends an N4 session connection release request to the S-UPF network element. The S-UPF network element sends an N4 session release response to the SMF network element. The AMF network element sends a terminal context release command to the S-RAN device. The S-RAN device sends a terminal context release complete to the AMF device.

The foregoing mainly describes the solutions in the embodiments of this application from a perspective of interaction between the network elements. It can be understood that each network element, such as a communications apparatus, includes hardware structures and/or software modules for executing corresponding functions, to implement the foregoing functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function units based on the foregoing method example. For example, each function unit may be obtained through division based on each corresponding function, or two or more functions may be integrated into one processing unit. The integrated unit may be implemented in a form of hardware, or may be implemented in a form of a software function unit. It should be noted that, in the embodiments of this application, division into the units is an example, and is merely a logical function division. In an actual implementation, another division manner may be used.

An example in which each function module is obtained through division based on each corresponding function is used below for description.

Figure 18:
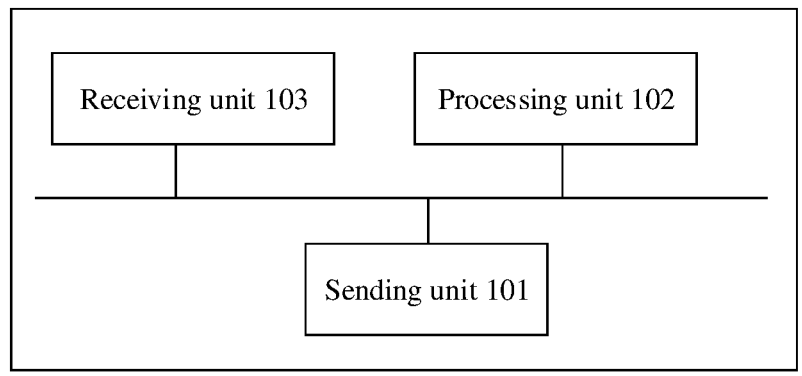
FIG. 18 to FIG. 21 each are a schematic structural diagram of a communications apparatus according to an embodiment of this application.

FIG. 18 is a schematic structural diagram of a communications apparatus according to an embodiment of this application. The communications apparatus may be the source access network device in the embodiments of this application, or may be a chip used in the source access network device. The communications apparatus may be configured to perform actions performed by the source access network device or the S-RAN device in the foregoing method embodiments.

The communications apparatus includes a sending unit 101 and a processing unit 102.

The sending unit 101 is configured to support the communications apparatus in performing S101 and S103 in the foregoing embodiment.

The processing unit 102 is configured to support the communications apparatus in performing the step of determining that the source access network device has received the first data packet in the foregoing embodiment.

Optionally, the sending unit 101 is further configured to support the communications apparatus in performing S109 in the foregoing embodiment.

Optionally, the communications apparatus may further include a receiving unit 103, configured to support the communications apparatus in performing S108 in the foregoing embodiment.

All related content of the steps in the foregoing method embodiments may be cited in function descriptions of the corresponding function modules, and details are not described herein again.

On a basis of hardware implementation, the receiving unit 103 and the sending unit 101 in this application may be a communications interface of the source access network device, or may be a communications interface used in the chip of the source access network device, and the processing unit 102 may be integrated into a processor of the source access network device or used in a processor of the chip of the source access network device.

Figure 19:
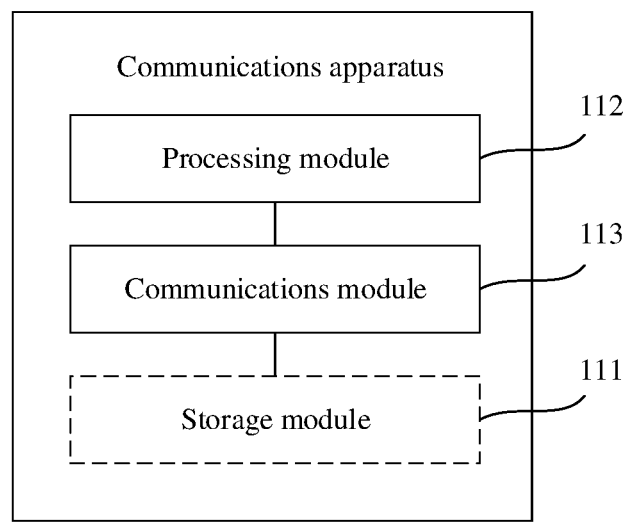

When an integrated unit is used, FIG. 19 is a schematic diagram of a possible logical structure of the communications apparatus in the foregoing embodiment. The communications apparatus may be a source access network device or a chip used in the source access network device, and may be configured to perform actions of the source access network device or the S-RAN device in the foregoing method embodiments. The communications apparatus includes a processing module 112 and a communications module 113.

The processing module 112 is configured to control and manage an action of the communications apparatus. For example, the processing module 112 is configured to perform a message or data processing step on a side of the communications apparatus. For example, the processing module 112 supports the communications apparatus in performing the step of determining that the source access network device has received the first data packet in S103 in the foregoing embodiment. The communications module 113 is configured to support the communications apparatus in performing S101, S103, and S108 in the foregoing embodiment. Optionally, the communications module 113 is further configured to support the communications apparatus in performing S109 in the foregoing embodiment, and/or another process performed by the communications apparatus in the technology described in this specification.

Optionally, the communications apparatus may further include a storage module 111, configured to store program code and data that are of the communications apparatus.

The processing module 112 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in this application. Alternatively, the processing module 112 may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is the processor 41 or the processor 45, the communications module 113 is the communications interface or the transceiver 43, and the storage module 111 is the memory 42, the communications apparatus in this application may be the communications device shown in FIG. 10.

For example, when the communications device shown in FIG. 10 is the source access network device, for example, the processor 41 and/or the processor 45 support/supports the source access network device in performing the step of determining that the source access network device has received the first data packet in S103 in the foregoing embodiment. The transceiver 43 is configured to support the source access network device in performing S101, S103, and S108 in the foregoing embodiment. Optionally, the transceiver 43 is further configured to support the source access network device in performing S109 in the foregoing embodiment.

Figure 20:
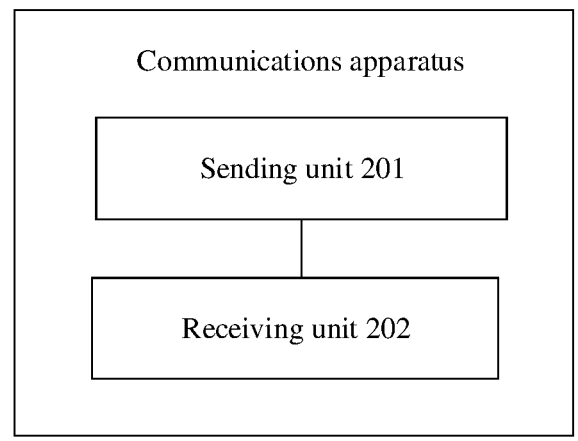

FIG. 20 is another schematic structural diagram of a communications apparatus according to an embodiment of this application. The communications apparatus may be the target access network device in the embodiments of this application, or may be a chip used in the target access network device. The communications apparatus may be configured to perform actions of the target access network device or the T-RAN device in the foregoing method embodiments.

The communications apparatus includes a sending unit 201 and a receiving unit 202. The sending unit 201 is configured to support the communications apparatus in performing S105 in the foregoing embodiment. The receiving unit 202 is configured to support the communications apparatus in performing S102 in the foregoing embodiment.

Optionally, the sending unit 201 is further configured to support the communications apparatus in performing S105, S106, S107, and S111 in the foregoing embodiment. Optionally, the receiving unit 202 is further configured to support the communications apparatus in performing S110 in the foregoing embodiment.

Figure 21:
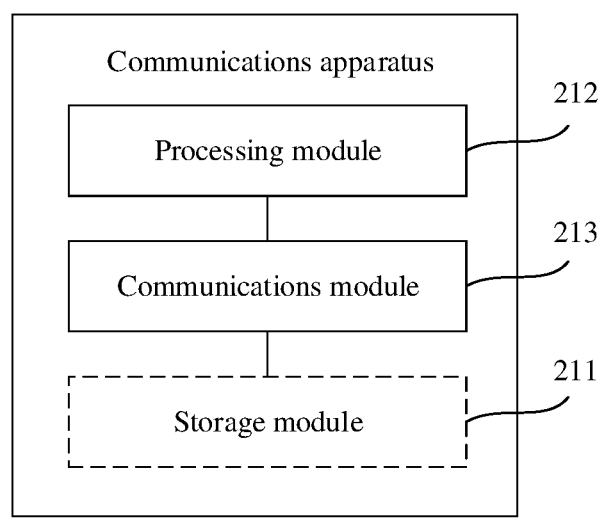

When an integrated unit is used, FIG. 21 is a schematic diagram of a possible structure of the communications apparatus in the foregoing embodiment. The communications apparatus may be a target access network device or a chip used in the target access network device. The communications apparatus includes a processing module 212 and a communications module 213. The processing module 212 is configured to: control and manage an action of the communications apparatus. For example, the processing module 212 is configured to support the communications apparatus in performing a message or data processing operation on a side of the communications apparatus in the foregoing embodiment, for example, a process of determining that the terminal successfully hands over from the source access network device to the target access network device. The communications module 213 is configured to support the communications apparatus in performing message or data sending and receiving operations on the side of the communications apparatus in the foregoing embodiment, for example, S102 and S105 in the foregoing embodiment.

Optionally, the communications module 213 is further configured to support the communications apparatus in performing S106, S107, S110, and S111 in the foregoing embodiment, and/or another process performed by the communications apparatus in the technology described in this specification.

Optionally, the communications apparatus may further include a storage module 211, configured to store program code and data that are of the communications apparatus.

The processing module 212 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in this application. Alternatively, the processing module 212 may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

When the processing module 212 is the processor 41 or the processor 45, the communications module 213 is the communications interface or the transceiver 43, and the storage module 211 is the memory 42, the communications apparatus in this application may be the device shown in FIG. 10.

For example, when the communications device shown in FIG. 10 is the target access network device, the processor 41 or the processor 45 is configured to support the target access network device in performing a message or data processing operation on a side of the target access network device in the foregoing embodiment. The transceiver 43 is configured to support the communications apparatus in performing data sending and receiving operations on the side of the communications apparatus in the foregoing embodiment, for example, S102 and S105 in the foregoing embodiment. Optionally, the transceiver 43 is further configured to support the communications apparatus in performing S106, S107, S110, and S111 in the foregoing embodiment.

It should be understood that division into the units in the communications apparatus is merely logical function division. In an actual implementation, all or some of the units may be integrated into a physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, in an implementation, each unit may be a separately disposed processing element, or may be integrated into a chip of the apparatus for implementation. Alternatively, each unit may be stored in the memory in a form of a program to be invoked by a processing element of the apparatus to perform a function of the unit. In addition, all or some of the units may be integrated together, or may be implemented independently. The processing element described herein may be an integrated circuit having a signal processing capability. In an implementation process, the steps in the foregoing methods or the foregoing units may be implemented by using a hardware integrated logic circuit in the processing element, or may be implemented in a form of software invoked by the processing element.

For example, the unit in any one of the foregoing apparatuses may be configured as one or more integrated circuits, for example, one or more application-specific integrated circuits (ASIC), or one or more microprocessors (DSP), or one or more field programmable gate arrays (FPGA), for implementing the foregoing methods. For another example, when the unit in the apparatuses is implemented in a form of a program invoked by the processing element, the processing element may be a general purpose processor, for example, a central processing unit (CPU), or another processor that can invoke the program. For another example, the units may be integrated and implemented in a form of a system-on-a-chip (SOC).

The receiving unit (or a unit used for receiving) is a communications interface of the apparatus, and is configured to receive a signal from another apparatus. For example, when the communications apparatus is implemented in a form of a chip, the receiving unit is a communications interface that is of the chip and that is configured to receive a signal from another chip or apparatus. The sending unit (or a unit used for sending) is a communications interface of the apparatus, and is configured to send a signal to another apparatus. For example, when the communications apparatus is implemented in a form of a chip, the sending unit is a communications interface that is of the chip and that is configured to send a signal to another chip or apparatus.

Figure 22:
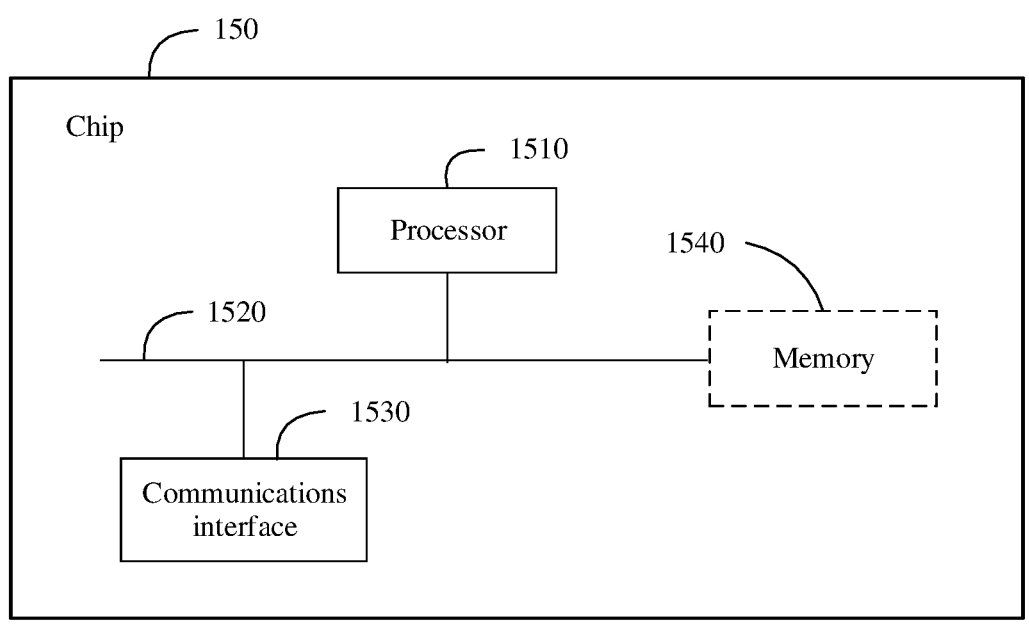
FIG. 22 is a schematic structural diagram of a chip according to an embodiment of this application.

FIG. 22 is a schematic structural diagram of a chip 150 according to an embodiment of this application. The chip 150 includes at least one processor 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, or a subset thereof, or an extension set thereof.

In this embodiment of this application, a corresponding operation is performed by invoking the operation instructions (where the operation instructions may be stored in an operating system) stored in the memory 1540.

In a possible implementation, chips used by a source access network device and a target access network device are similar, and different apparatuses may use different chips to implement respective functions.

The processor 1510 controls operations of the source access network device and the target access network device, and the processor 1510 may also be referred to as a CPU (central processing unit). The memory 1540 may include a read-only memory and a random access memory, and provide instructions and data for the processor 1510. A part of the memory 1540 may further include a non-volatile random access memory (NVRAM). In a specific application, the memory 1540, the communications interface 1530, and the memory 1540 are coupled together through a bus system 1520. The bus system 1520 may further include a power bus, a control bus, a status signal bus, and the like in addition to a data bus. However, for clear description, various buses are marked as the bus system 1520 in FIG. 22.

The methods disclosed in the foregoing embodiments of this application may be applied to the processor 1510, or may be implemented by the processor 1510. The processor 1510 may be an integrated circuit chip and has a signal processing capability. In an implementation process, the steps in the foregoing method may be implemented by using a hardware integrated logical circuit in the processor 1510, or by using an instruction in a form of software. The processor 1510 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1510 may implement or perform the methods, steps, and logical block diagrams that are disclosed in the embodiments of this application. The general purpose processor may be a microprocessor, or the processor may be any conventional processor, or the like. The steps of the methods disclosed with reference to the embodiments of this application may be directly performed and accomplished by a hardware decoding processor, or may be performed and accomplished by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

Optionally, the communications interface 1530 is configured to perform the sending and receiving steps of the source access network device and the target access network device in the embodiments shown in FIG. 11 and FIG. 13 to FIG. 17D.

The processor 1510 is configured to perform the processing steps of the source access network device and the target access network device in the embodiments shown in FIG. 11 and FIG. 13 to FIG. 17D.

In the foregoing embodiment, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk, SSD), or the like.

According to one aspect, a computer-readable storage medium is provided. The computer-readable storage medium stores instructions. When the instructions are run, a source access network device or a chip used in the source access network device is enabled to perform S101, S103, S108, and S109 in the embodiments.

According to another aspect, a computer-readable storage medium is provided. The computer-readable storage medium stores instructions. When the instructions are run, a target access network device or a chip used in the target access network device is enabled to perform S102, S105, S106, S107, S110, and S111 in the embodiments.

The foregoing readable storage medium may include any medium that can store program code, such as a USB flash drive, a removable hard disk, a read-only memory, a random access memory, a magnetic disk, or an optical disc.

According to one aspect, a computer program product including instructions is provided. The computer program product stores the instructions. When the instructions are run, a source access network device or a chip used in the source access network device is enabled to perform S101, S103, S108, and S109 that are in the embodiments and that are performed by the source access network device in the embodiments.

According to another aspect, a computer program product including instructions is provided. The computer program product stores the instructions. When the instructions are run, a target access network device or a chip used in the target access network device is enabled to perform S102, S105, S106, S107, S110, and S111 in the embodiments.

According to one aspect, a chip is provided. The chip is used in a source access network device. The chip includes at least one processor and a communications interface. The communications interface is coupled to the at least one processor. The processor is configured to run instructions to perform S101, S103, S108, and S109 in the embodiments.

According to another aspect, a chip is provided. The chip is used in a target access network device. The chip includes at least one processor and a communications interface. The communications interface is coupled to the at least one processor. The processor is configured to run instructions to perform S102, S105, S106, S107, S110, and S111 in the embodiments.

According to one aspect, this application provides a communications system. The communications system includes the communications apparatus described in FIG. 18, the communications apparatus described in FIG. 20, and a terminal.

According to another aspect, this application provides a communications system. The communications system includes the communications apparatus described in FIG. 19, the communications apparatus described in FIG. 21, and a terminal.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and is considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the appended claims of this application and their equivalent technologies.

What is claimed is:

1. A method, comprising:
   sending, by a source access network device, a first data packet of a terminal to a target access network device;
   determining, by the source access network device, that the target access network device has received the first data packet;
   after determining that the target access network device has received the first data packet, sending, by the source access network device, a first message to the terminal, wherein the first message indicates to the terminal to hand over to the target access network device;
   sending, by the source access network device, sequence number (SN) status information to the target access network device, wherein the SN status information is used by the target access network device to send a data packet to the terminal; and
   sending, by the source access network device, a data packet that carries no SN status information to the target access network device, wherein a sequence number of the data packet that carries no SN status information is determinable by the target access network device based on the SN status information.

2. The method according to claim 1, further comprising:
   sending, by the target access network device, first information, wherein the first information indicates that the handover of the terminal to the target access network device is allowed; and
   receiving, by the source access network device, the first information from the target access network device.

3. The method according to claim 2, wherein before sending, by the source access network device, the first data packet to the target access network device, the method further comprises:
   determining, by the source access network device based on the first information, that the target access network device allows the handover of the terminal to the target access network device.

4. The method according to claim 1, wherein the first data packet comprises a replicated data packet, and the method further comprises:
   obtaining, by the source access network device, the replicated data packet; or
   in response to a condition under which the terminal hands over between access network devices being satisfied, obtaining, by the source access network device, the replicated data packet.

5. The method according to claim 4, wherein obtaining, by the source access network device, the replicated data packet comprises:
   replicating, by the source access network device, a data packet satisfying a preset condition in at least one data packet of the terminal, to obtain the replicated data packet, wherein the data packet satisfying the preset condition comprises at least one of the following cases: a data packet using a preset quality of service (QOS) flow, a data packet on a preset session, a data packet whose packet loss rate is less than or equal to a preset threshold, or a data packet on a preset radio bearer; or
   replicating, by the source access network device, a random data packet of the terminal to obtain the replicated data packet.

6. The method according to claim 1, further comprising:
   receiving, by the target access network device, the SN status information from the source access network device;
   obtaining, by the target access network device, a second data packet based on the SN status information and the data packet that carries no SN and that is from the source access network device, wherein the data packet that carries no SN is a data packet in the first data packet or a data packet of the terminal in the source access network device; and
   sending, by the target access network device, the second data packet to the terminal.

7. The method according to claim 1, wherein determining, by the source access network device, that the target access network device has received the first data packet comprises:
   receiving, by the source access network device, a second message from the target access network device, wherein the second message indicates that the target access network device has received the first data packet; or
   determining, by the source access network device based on latency information, that the target access network device has received the first data packet.

8. The method according to claim 7, further comprising:
   determining, by the source access network device, the latency information based on QoS information of the first data packet; or
   obtaining, by the source access network device, the latency information from a session management function network element.

9. The method according to claim 1, further comprising:
   receiving, by the target access network device, the first data packet of the terminal from the source access network device; and
   in response to the terminal successfully handing over from the source access network device to the target access network device, sending, by the target access network device, the first data packet to the terminal.

10. A communication system, comprising:
a source access network device; and
a target access network device;
wherein the source access network device is configured to:
send a first data packet of a terminal to the target access network device;
determine that the target access network device has received the first data packet;
after determining that the target access network device has received the first data packet, send a first message to the terminal, wherein the first message indicates to the terminal to hand over to the target access network device;
send sequence number (SN) status information to the target access network device, wherein the SN status information is used by the target access network device to send a data packet to the terminal; and
send a data packet that carries no SN status information to the target access network device, wherein a sequence number of the data packet that carries no SN status information is determinable by the target access network device based on the SN status information; and
wherein the target access network device is configured to:
receive the first data packet of the terminal from the source access network device; and
when the terminal successfully hands over from the source access network device to the target access network device, send the first data packet to the terminal.

11. The system according to claim 10, wherein:
the target access network device is further configured to send first information to the source access network device, wherein the first information indicates that a handover of a terminal to the target access network device is allowed; and
the source access network device is further configured to receive the first information.

12. The system according to claim 11, wherein the source access network device is further configured to:
before sending a first message to the terminal, determine, based on the first information, that the target access network device allows the handover of the terminal to the target access network device.

13. The system according to claim 10, wherein the first data packet comprises a replicated data packet, and the source access network device is further configured to:
obtain the replicated data packet; or
in response to a condition under which the terminal hands over between the access network devices being satisfied, obtain the replicated data packet.

14. The system according to claim 13, wherein the source access network device is further configured to:
replicate a data packet satisfying a preset condition in at least one data packet of the terminal, to obtain the replicated data packet, wherein the data packet satisfying the preset condition comprises at least one of the following cases: a data packet using a preset quality of service (QOS) flow, a data packet on a preset session, a data packet whose packet loss rate is less than or equal to a preset threshold, or a data packet on a preset radio bearer; or
replicate a random data packet of the terminal to obtain the replicated data packet.

15. The system according to claim 10, wherein:
the target access network device is further configured to:
receive the SN status information from the source access network device;
obtain a second data packet based on the SN status information and the data packet that carries no SN and that is from the source access network device, wherein the data packet that carries no SN is a data packet in the first data packet or a data packet of the terminal in the source access network device; and
send the second data packet to the terminal.

16. The system according to claim 10, wherein:
the target access network device is further configured to send a second message to the source access network device, wherein the second message indicates that the target access network device has received the first data packet, and the source access network device is further configured to: receive the second message; or
the source access network device is further configured to determine, based on latency information, that the target access network device has received the first data packet.

17. The system according to claim 16, wherein the source access network device is further configured to:
determine the latency information based on QoS information of the first data packet; or
obtain the latency information from a session management function network element.

18. A communication apparatus, comprising:
a processor; and
a non-transitory memory, wherein the non-transitory memory is configured to store instructions; and
wherein the processor is configured to run the instructions stored in the non-transitory memory to implement the following:
sending a first data packet of a terminal to a target access network device;
determining that the target access network device has received the first data packet;
after determining that the target access network device has received the first data packet, sending a first message to the terminal, wherein the first message indicates to the terminal to hand over to the target access network device;
sending sequence number (SN) status information to a target access network device, wherein the SN status information is used by the target access network device to send a data packet to a terminal; and
sending a data packet that carries no SN status information to the target access network device, wherein a sequence number of the data packet that carries no SN status information is determinable by the target access network device based on the SN status information.

19. The apparatus according to claim 18, wherein the processor is configured to run the instructions stored in the non-transitory memory to further implement the following:
receive first information from the target access network device, wherein the first information indicates that the handover of the terminal to the target access network device is allowed.

20. The apparatus according to claim 19, wherein the processor is configured to run the instructions stored in the non-transitory memory to further implement the following:
determine, based on the first information, that the target access network device allows the handover of the terminal to the target access network device.

* * * * *